(12) United States Patent
Graham

(10) Patent No.: US 9,720,719 B2
(45) Date of Patent: Aug. 1, 2017

(54) METHOD AND SYSTEM FOR OPTIMIZING VIRTUAL DISK PROVISIONING

(71) Applicant: Citrix Systems, Inc., Fort Lauderdale, FL (US)

(72) Inventor: Simon Graham, Bolton, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 731 days.

(21) Appl. No.: 14/139,621

(22) Filed: Dec. 23, 2013

(65) Prior Publication Data

US 2015/0178105 A1 Jun. 25, 2015

(51) Int. Cl.
| G06F 9/455 | (2006.01) |
| G06F 9/44 | (2006.01) |
| G06F 9/00 | (2006.01) |
| G06F 15/16 | (2006.01) |
| G06F 3/06 | (2006.01) |

(52) U.S. Cl.
CPC ............ *G06F 9/45558* (2013.01); *G06F 8/68* (2013.01); *G06F 3/0664* (2013.01)

(58) Field of Classification Search
CPC .................................. G06F 8/60; G06F 3/664
See application file for complete search history.

(56) References Cited

U.S. PATENT DOCUMENTS

| 8,825,972 | B1* | 9/2014 | Tsaur | .................. | G06F 11/1453 |
| | | | | | 707/646 |
| 9,053,107 | B1* | 6/2015 | Le | ............................ | G06F 3/06 |

| 2009/0216975 | A1 | 8/2009 | Halperin et al. | | |
| 2011/0145803 | A1* | 6/2011 | Soderstedt | ................ | G06F 8/66 |
| | | | | | 717/154 |
| 2012/0060004 | A1 | 3/2012 | Rope et al. | | |
| 2012/0185612 | A1* | 7/2012 | Zhang | ..................... | H03M 7/30 |
| | | | | | 709/247 |
| 2012/0297181 | A1* | 11/2012 | Lee | .......................... | G06F 8/68 |
| | | | | | 713/2 |

(Continued)

OTHER PUBLICATIONS

International Search Report and Written Opinion dated Sep. 30, 2014; International Application No. PCT/US2013/077623; (12 pages).

*Primary Examiner* — Bing Zhao
(74) *Attorney, Agent, or Firm* — Finnegan, Henderson, Farabow, Garrett & Dunner, LLP

(57) ABSTRACT

A first computing device is provided for virtual disk provisioning. The first computing device includes one or more processors configured to provide a first virtual disk and a first publish differencing disk. The one or more processors are further configured to obtain meta data associated with the first virtual disk and the first publish differencing disk, and generate one or more first differencing patches and one or more second differencing patches. The first and second differencing patches having a binary format. The first computing device further includes a storage configured to store data associated with the first virtual disk and the first publish differencing disk, the meta data, and the one or more first and second differencing patches. The first computing device further includes a communication subsystem configured to provide one or more first and second differencing patches to provision the virtual machine associated with a second computing device.

30 Claims, 12 Drawing Sheets

(56) References Cited

U.S. PATENT DOCUMENTS

2013/0007733 A1* 1/2013 Fries .................. G06F 8/68
718/1
2014/0237464 A1* 8/2014 Waterman ............ G06F 8/65
717/172

* cited by examiner

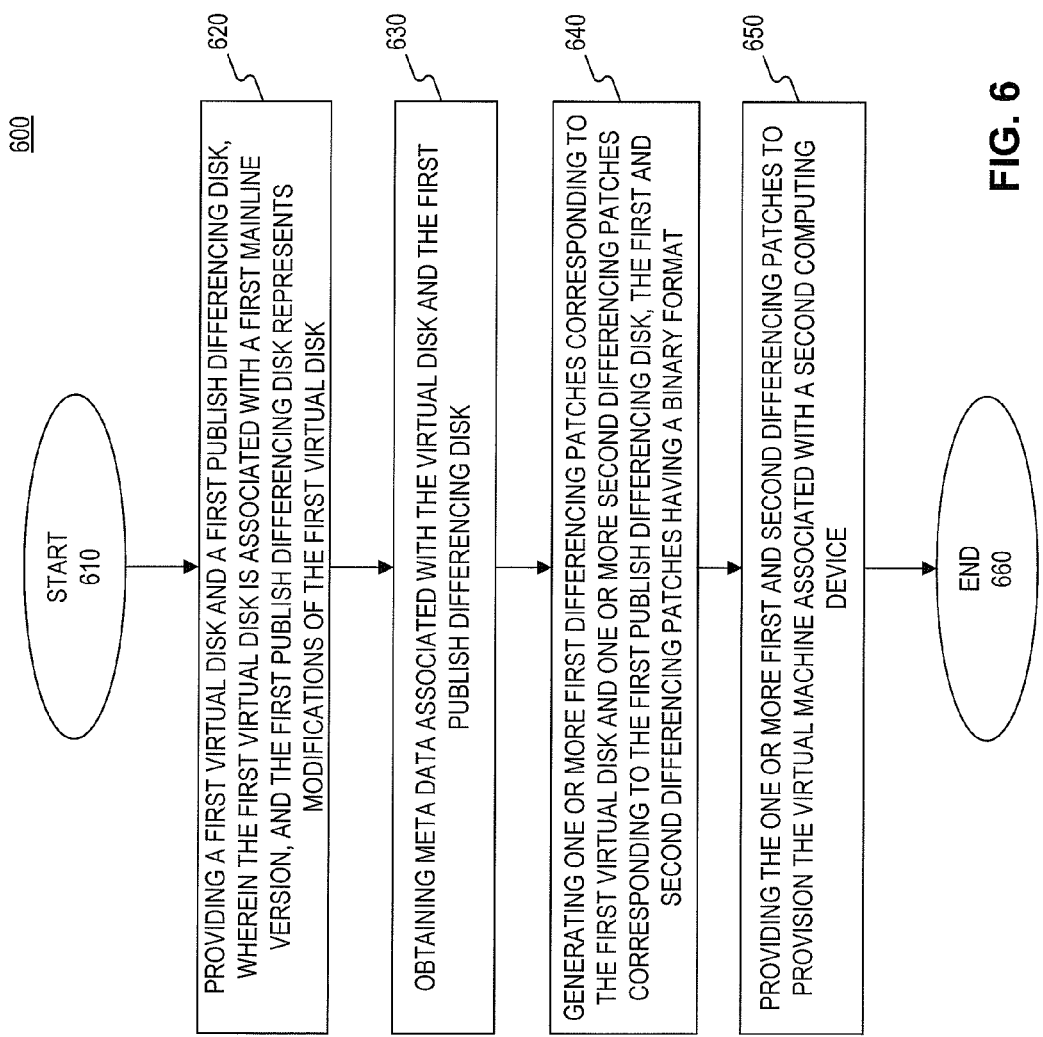

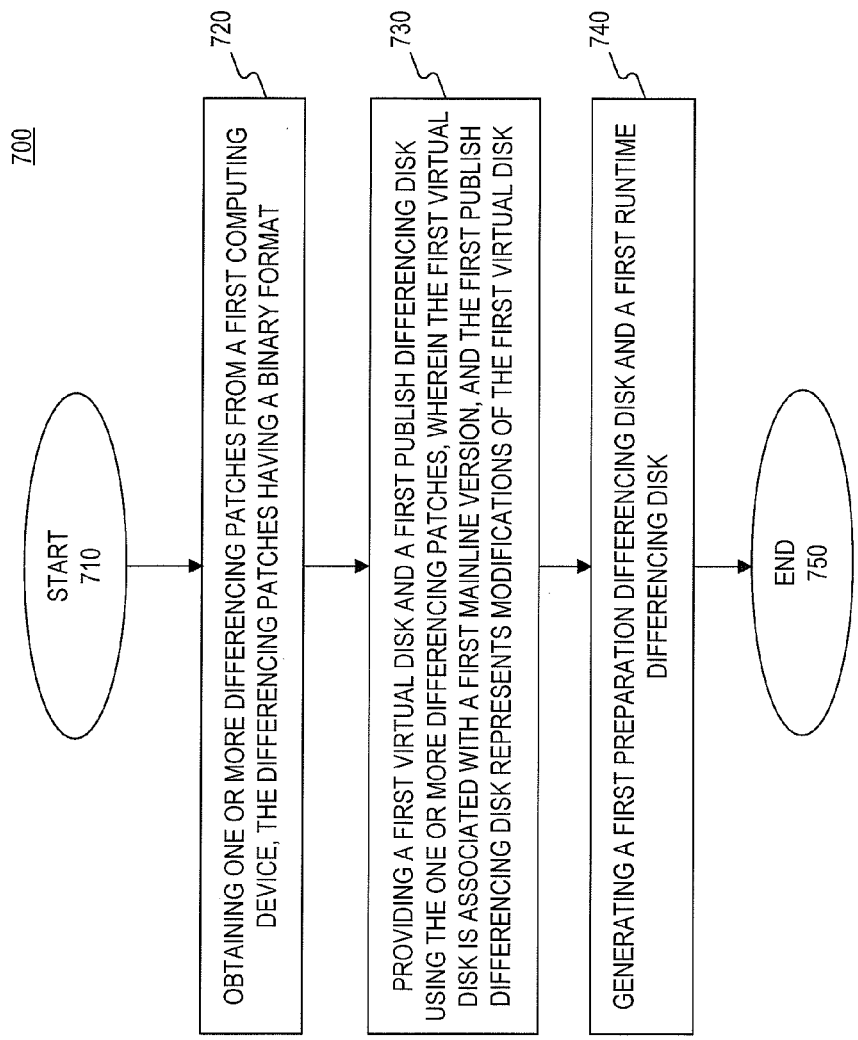

METHOD AND SYSTEM FOR OPTIMIZING VIRTUAL DISK PROVISIONING

FIELD

The present disclosure generally relates to virtual disk technologies. Exemplary embodiments relate to methods and systems for optimizing of provisioning a virtual disk associated with a virtual machine.

BACKGROUND

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running Microsoft Windows operating system may host a virtual machine that simulates a computer running a Linux operating system, based on which Linux-based software can be executed.

In a virtualization environment, a virtual machine can have one or more virtual disks. A virtual disk can have disk partitions and a file system, similar to those of a physical disk. The file system of a virtual disk can also include files and folders. Therefore, a virtual disk can be a system disk, which includes disk partitions and system files. A virtual disk can also be a user disk, which includes user data such as user files and folders. Virtual disk can be used as a virtual hard disk drive of a virtual machine. For various purposes, virtual disks can also be transmitted from a client device to a server or vice versa. For example, a virtual system disk can be transmitted from a server to a client device to set up or update the system disk of a virtual machine executed on the client device. Currently, virtual disks are transmitted as compressed files, such as compressed (Virtual Hard Disk) VHD files by using GET and PUT instructions in an HTTP protocol.

In particular, when publishing a new version of a system disk of a virtual machine executed on a client device, the server can generate a corresponding compressed VHD file for the system disk, capturing the differences between the current version and the new version of the system disk. The server, via a synchronizer, can then compress the VHD file into a separate copy that is stored in a data storage space (e.g., a repository) of the server. The client device can request the compressed the VHD file by sending a HTTP GET instruction. The client device can then download the compressed VHD file and decompress it and apply the decompressed VHD file to install or update the system disk of the client device.

On the other hand, when providing backup of a user disk of the client device, the client device can generate a corresponding compressed VHD file of the user disk, which stores the differences between the current version and the new version of the user disk. The client device can send the compressed VHD file to a server by sending a HTTP PUT instruction to the server. The server, via a synchronizer, can then store the compressed VHD file in the repository. After the server receives several compressed VHD files representing differences among several versions of the user disk, it can decompress the several VHD files and combine the differences together to form one new VHD file. Such decompression and combining process is sometimes also referred to as backup rollup process. The server can then recompress the new VHD file and store it in the repository.

The above described process of installing, updating, or providing backup of virtual disks (e.g., system disks or user disks) is sometimes also referred to as virtual disk provisioning. Because the frequent compressing and decompressing by the client device and the server, however, the current virtual disk provisioning technologies often consume significant computing power. Moreover, the server and the client device may not support the same format of the virtual disk. For example, a server can support a Virtual Machine Disk (VMDK) format, but a client device can support a VHD file format, or an enhanced virtual disk format (e.g., a VHDX format). Therefore, transmitting a virtual disk in a certain format (e.g., VHD format) from a server to a client device or vice versa can cause incompatibility issues if the receiving device supports another file format.

Furthermore, when the client device sends a compressed virtual disk file, such as a VHD file, to provide backup of the user disk, the backup rollup process can also consume significant computer resources and restrict the scalability of the backup operation. For example, computer resources of a server can be depleted quickly if a large number of client devices request backup, which would necessitate many compressing and decompressing operations. Furthermore, under some circumstances, unused and deleted blocks of the virtual disk may still be included in the compressed VHD file and transmitted to the receiving device, even if the blocks contain no useful information. Additionally, when a server transmits an update of the system disk to a client device in a VHD file format, the client device can be required to download all differences between all prior versions of the system disk and then combine the differences. The downloading and combining of all prior versions can also result in wasting network bandwidth and computing resources.

BRIEF DESCRIPTION OF THE DRAWINGS

Reference will now be made to the accompanying drawings showing example embodiments of this disclosure. In the drawings:

FIG. 6 is a flowchart of an exemplary method for virtual disk provisioning associated with a first computing device, consistent with embodiments of the present disclosure.

FIG. 7 is a flowchart of an exemplary method for virtual disk provisioning associated with a second computing device, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide optimization technologies for provisioning a virtual disk associated with a virtual machine. The optimization techniques described herein can support different formats used by virtual machines of the server and the client devices. The optimization techniques described herein can also eliminate or reduce the need of compressing patches during the virtual disk provisioning process. The optimization techniques can also provide a scalable solution for a virtual disk backup and provide an efficient manner for transmitting virtual disk data. Moreover, the optimization techniques can enable the virtual disk provisioning process to consume less network bandwidth and computer resources.

Figure 1:
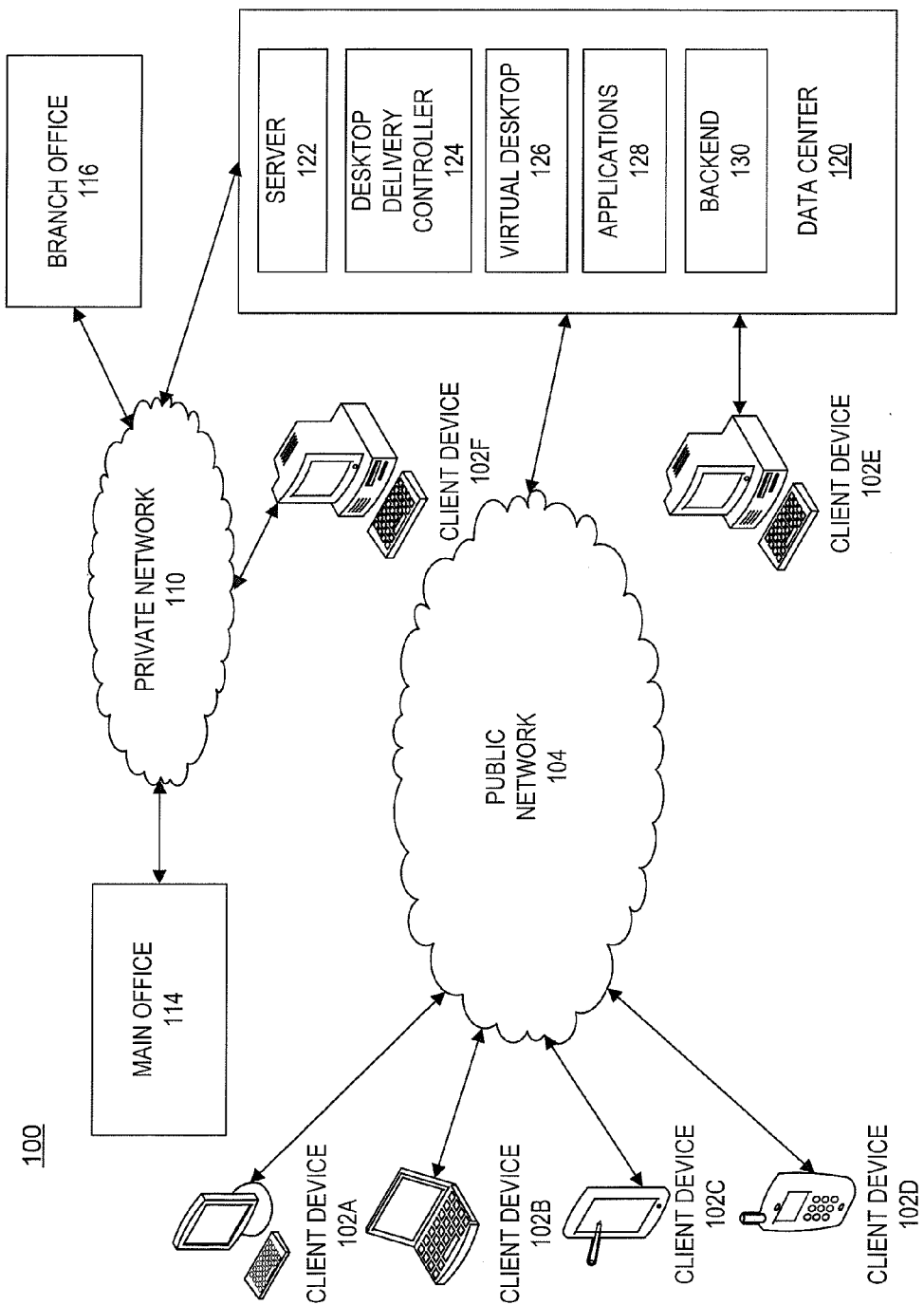
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiment, a main office 114 and a branch office 116 can also include one or more client devices that are similar to client devices 102A-F. Main office 114 can be located, for example, in a principle place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Via the communication subsystem, server 122 can communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple user to access a single shared remote-desktop-services desktop, virtual desktop infrastructure desktops allowing each user to have their own virtual machine, streaming disk images, a local virtual machine, individual applications (e.g., one or more applications 128), or a combination thereof.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Figure 2A:
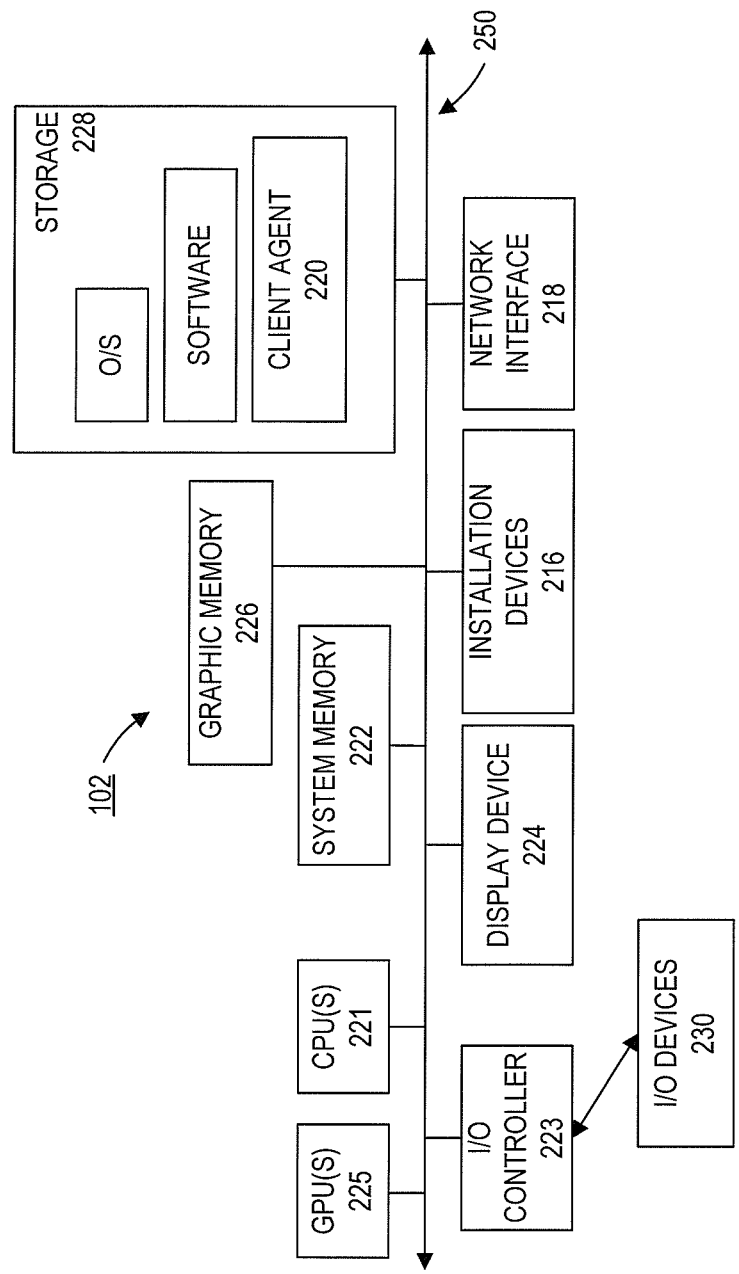
FIGS. 2A-2B are block diagrams of an exemplary computing device, consistent with embodiments of the present disclosure.
Figure 2B:
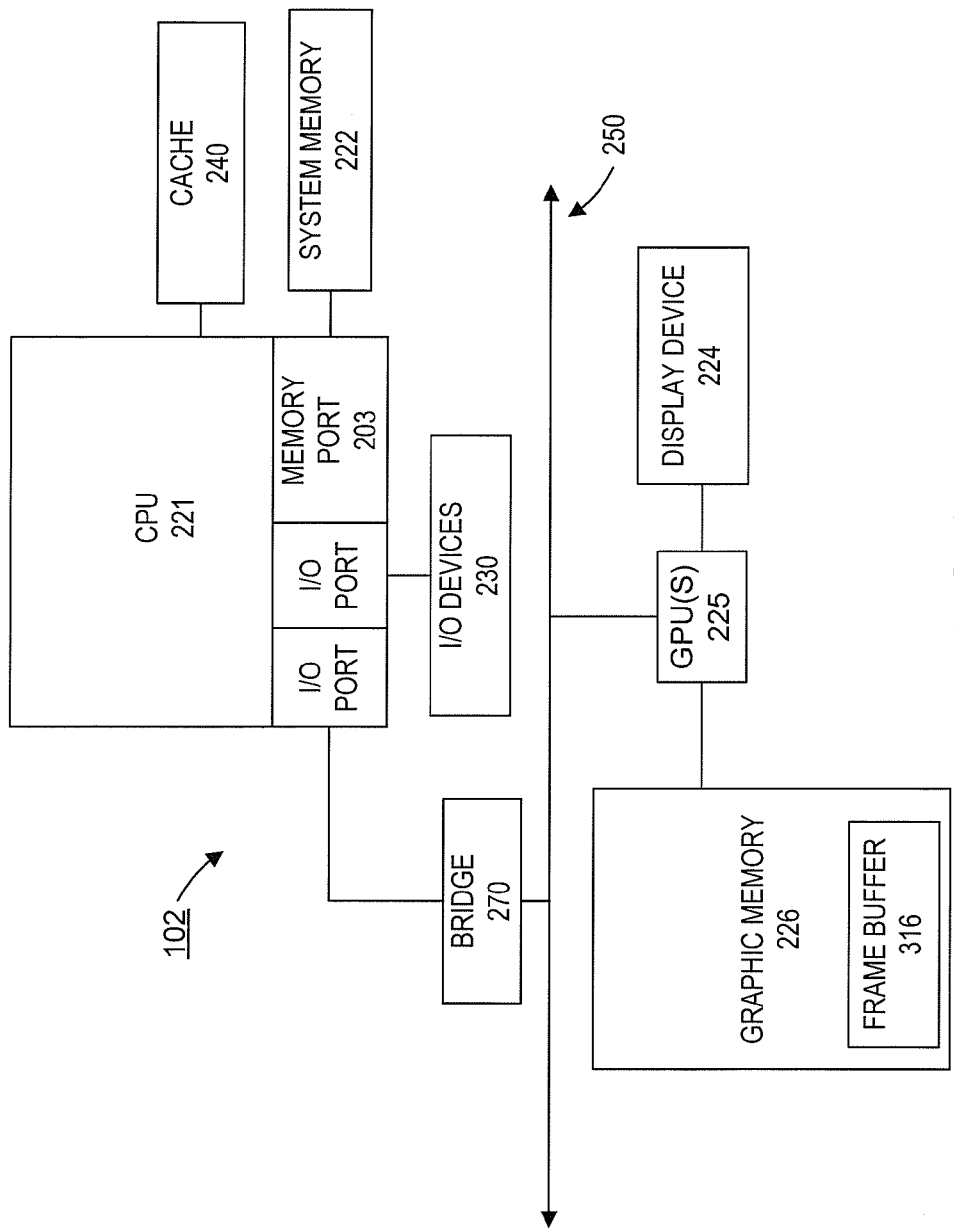

FIGS. 2A-2B are block diagrams of an exemplary client device 102, consistent with embodiments of the present disclosure. As shown in FIG. 2A, each client device 102 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). The memory can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 2B) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operates on data stored in system memory 222 and communicates with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 225 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Client device 102 can also include display device 224 and an input/output (I/O) device 230 (e.g., a keyboard, mouse, or pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for the client device 102.

FIG. 2B depicts an embodiment of an exemplary client device 102 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 316. Frame buffer 316 can be a graphic output device that drives a display device (e.g., display device 224) from a memory buffer of graphic memory 226 containing a complete frame of graphical data. Frame buffer 316 can store the final graphic frames, which are to be displayed on display device 224.

As shown in FIG. 2A, client device 102 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Client device 102 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, client device 102 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

Figure 3:
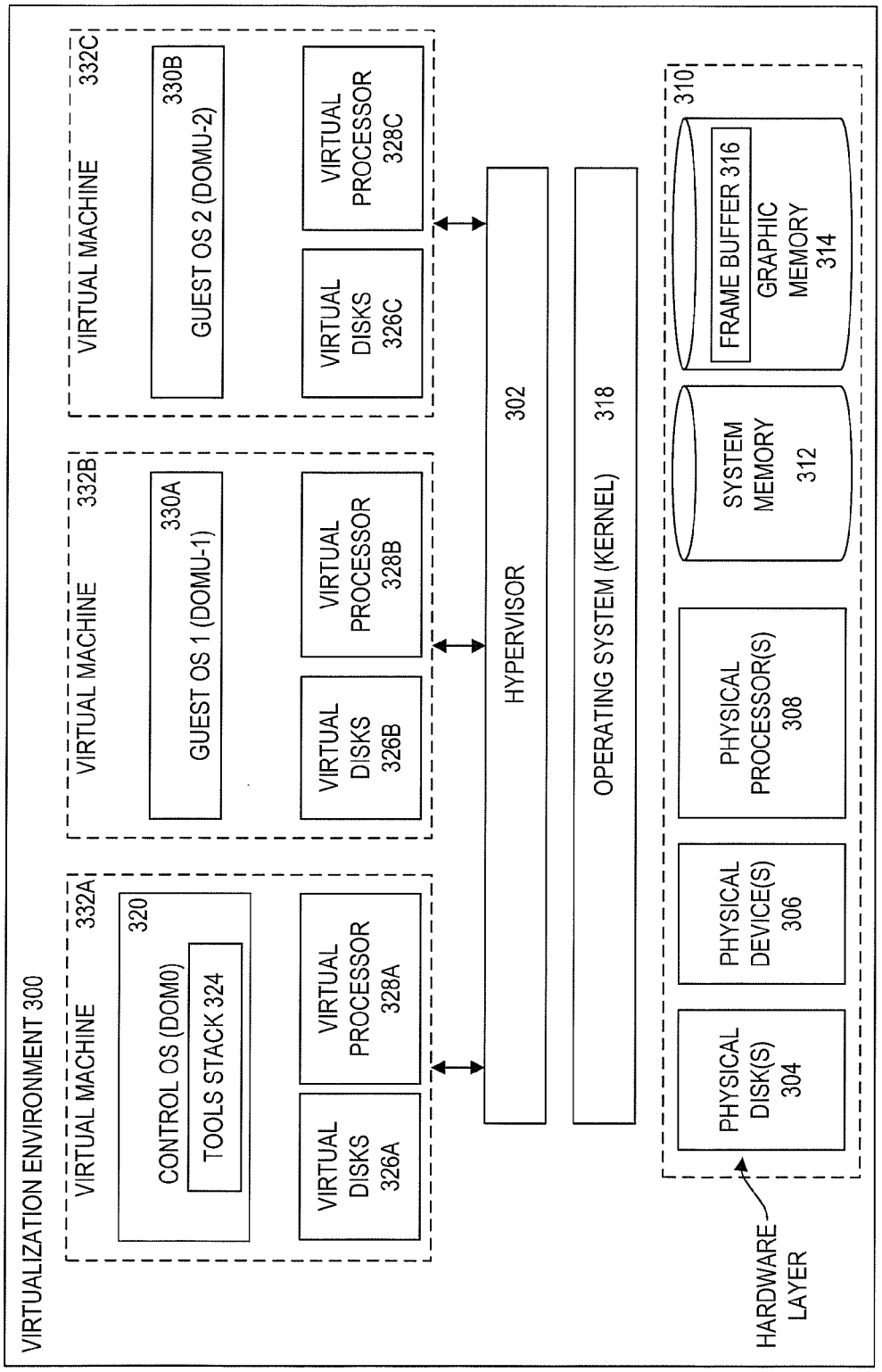
FIG. 3 is a block diagram of an exemplary virtualization environment, consistent with embodiments of the present disclosure.

FIG. 3 is a block diagram of an exemplary virtualization environment 300. In some embodiments, virtualization environment 300 can include a computing device (e.g., client device 102 or server 122). In some embodiments, the modules, programs, virtual machines, and commands stored and executed by virtualization environment 300 can be executed by more than one computing device. For example, virtualization environment 300 can include a server farm.

Virtualization environment 300 can include a hardware layer 310 that can include one or more physical disks 304, one or more physical devices 306, one or more physical processors 308, a system memory 312, and a graphic memory 314. In some embodiments, frame buffer 316 can be stored within a memory element in graphic memory 314 and can be executed by one or more of physical processors 308.

Physical disk 304 can be either an internal or an external hard disk. Virtualization environment 300, in some embodiments, can communicate with an external hard disk that is included in the hardware layer 310 as a physical disk 304. Physical devices 306, in some embodiments, can be any combination of devices included in virtualization environment 300 and external devices that communicate with virtualization environment 300. Physical device 306 can be any device such as a network interface card, a video card, a keyboard, a mouse, an input device, a monitor, a display device, speakers, an optical drive, a storage device, a universal serial bus connection, any device connected to virtualization environment 300, any device communicating with virtualization environment 300, a printer, a scanner, or any other device that is desired. In some embodiments, physical processors 308 can be any processor and can include, for example, CPUs and GPUs.

System memory 312 can include any type of memory that can store data, programs, firmwares, or set of executable instructions. Programs, firmwares, or executable instructions stored in system memory 312 can be executed by one or more physical processors 308 of virtualization environment 300. Graphic memory 314 can be any memory space accessible by the physical processors 308, including local memory, system memory, on-chip memories, and hard disk. Physical processors 308 can display certain graphics corresponding to graphical data stored in graphic memory 316 on a display device of physical devices 306.

Virtualization environment 300 can further include an operating system 318 that can be stored in a memory element in system memory 312 and executed by one or more of physical processors 308. Operating system 318 can also be referred to as kernel. Moreover, virtualization environment 300 can include a hypervisor 302. Hypervisor 302 can be a program executed by physical processors 308 in virtualization environment 300 to manage any number of virtual machines. Hypervisor 302 can be referred to as a virtual machine monitor, or platform virtualization software. In some embodiments, hypervisor 302 can be any combination of executable instructions and hardware that monitors virtual machines executing on a computing device. Hypervisor 302 can be stored in a memory element in system memory 312.

Hypervisor 302, in some embodiments, can provide virtual resources to one or more virtual machines, e.g., virtual machines 332A-C. A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine (e.g., virtual machine 332A). A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine (e.g., virtual machines 332B-C). In some embodiments, a dom0 virtual machine can have direct access to host computer's hardware resources and thus the control program can be executed by the host computer's operating system. A dom0 virtual machine can have access to the host computer's hardware resources through a hypervisor that either runs directly on the host computer's hardware (i.e., a bare metal hypervisor) or runs within the host computer's operating system (i.e., a hosted hypervisor). In some embodiments, a virtual machine can also be a service domain virtual machine, also referred as a Domain S or domS virtual machine (not shown).

Hypervisor 302, in some embodiments, can provide virtual resources to guest operating systems (domU) 330A-B and/or control operating system (dom0) 320 in any manner such that hypervisor 302 simulates any desirable operating systems (e.g., Windows, Linux, Unix) to execute on virtual machines 332A-C. The system resources can include, for example, hardware layer 310 and any other component included in virtualization environment 300. In these embodiments, hypervisor 302 may be used to emulate virtual hardware, partition physical hardware, virtualize physical hardware, or execute virtual machines that provide access to computing environments. In some embodiments, hypervisor 302 can control processor scheduling and memory partitioning for virtual machine 332A-C executing in virtualization environment 300.

In some embodiments, hypervisor 302 can create virtual machines 332A-C, in which guest operating systems 330A-B or control operating system 320 execute, respectively. As an example, hypervisor 302 can load a virtual machine image to create a virtual machine 332. As another example, hypervisor 302 can execute guest operating systems 330A and 330B within virtual machines 332B and 332C, respectively. Guest operating systems 330A-B are further described in details below.

As shown in FIG. 3, in some embodiments, hypervisor 302 of virtualization environment 300 can be a host hypervisor, or a hypervisor that executes within an operating system (kernel) 318 executing on virtualization environment 300. As a host hypervisor, hypervisor 302 can execute within operating system 318. And virtual machines 332A-C execute at a level above hypervisor 302. If hypervisor 302 is a host hypervisor, operating system 318 can be referred to as a host operating system, while the other operating systems (e.g., operating systems 330A-B) can be referred to as guest operating systems. Guest operating systems 330A-B can execute on virtual machines 332B-C (or domU virtual machines).

In some embodiments, hypervisor 302 of virtualization environment 300 can be a bare metal hypervisor, or a hypervisor that has direct access to all applications and processes executing in the host computing device (e.g., client device 102), all resources on the host computing device, and all hardware on the host computing device (e.g., the hardware layer shown in FIG. 3) or communicating with the host computing device. While a host hypervisor accesses system resources through a host operating system (e.g., operating system 318), a bare metal hypervisor can directly access all system resources. For example, if hypervisor 302 is a bare metal hypervisor, it can execute directly on one or more physical processors 308, and can include program data stored in the system memory 312 and graphic memory 314.

In a virtualization environment that employs a bare metal hypervisor configuration, the host operating system can be executed by one or more virtual machines 332. Thus, a user of the computing device can designate one or more virtual machines 332 as the dom0 virtual machine (e.g. virtual machine 332A). This dom0 virtual machine can imitate the host operating system by allowing a user to interact with the computing device in substantially the same manner that the user would interact with the computing device via host operating system 318.

In some embodiments, virtualization environment 300 can host or execute one or more virtual machines 332A-C. As described above, a virtual machine executing a control operating system can be referred to as a dom0 virtual machine, and a guest virtual machine can be referred as a domU virtual machine. A virtual machine 332 can be a set of executable instructions that, when executed by physical processors 308, imitate the operation of a physical computing device such that programs and processes can be executed on virtual machine 332 in a manner similar to that on a physical computing device. It is appreciated that virtualization environment 300 can host any number of virtual machines 332. In some embodiments, each virtual machine 332 can be provided, such as by hypervisor 302, with a unique virtual view of the physical hardware, memory, processor, and other system resources available to that virtual machine 332. The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, each virtual machine 332 can be provided with a substantially similar virtual view of the physical hardware, memory, processor, and other system resources available to the virtual machines 332.

As shown in FIG. 3, virtual machines 332A-C can include one or more virtual disks 326A-C (collectively as 326). Virtual disks 326 can correspond to, for example, one or more physical disks or a portion of a physical disk (e.g., physical disks 304). As an example, virtual disk 326A can be allocated a first portion of physical disks 304; virtual disk 326B can be allocated a second portion of physical disks 304; and virtual disk 326C can be allocated a third portion of physical disks 304. In some embodiments, one or more of virtual disks 326A-C can include disk partitions and a file system, similar to those of a physical disk. For example, virtual disk 326A can include a system disk, which includes disk partitions and system files associated with virtual machine 332A. In some embodiments, the system disk can be shared among virtual machines. For example, virtual machines 332B and 332C can have the same or similar system disk.

The file systems of virtual disks 326A-C can also include files and folders. For example, virtual disk 326A can also include a user disk, which can store user data such as user files and folders. The user data stored on a user disk is also referred to as persistent user data. In some embodiments, the system disk and/or the user disk of a virtual machine of a client device (e.g., client device 102) can be synchronized with the corresponding disks stored in a server (e.g., server 122). The synchronization of system disk and/or the user disk between the server and the client device can include, for example, updating the system disk to a newer version published by the server and providing backup of the user disk. The synchronization is further described in detail below. In some embodiments, a virtual disk can also include a local disk. The local disk can store local data associated with a virtual machine (e.g., virtual machine 332B). The local disk can also include persistent user data. In some embodiments, the persistent user data stored on a local disk cannot be synchronized with a server.

A virtual disk (e.g., virtual disks 326) can be accessed, modified, updated, or provisioned by a client device or a server. As an example, as described above, when the server publish a new version of the system disk, the server can update the system disk by sending the differences between the new version and the current version to the client device. Moreover, by using the system disk, the server can enable desktop management and patching of the client device. Furthermore, the client device can modify its user disk by writing new data to, or modifying existing data stored on, the user disk. In some embodiments, a virtual disk can be stored as a virtual disk file having a format such as a VHD format, VHDX format, VMDK format, qcow format, qcow2 format, virtual box virtual disk image (VDI) format, and parallels virtual hard disk drive (HDD) format, or a binary format. In some embodiments, a virtual disk can include one or more sectors. A sector can include a number of bytes. For example, a sector can have a size of 512 bytes. Moreover, in some embodiments, one sector or a group of sector can form a block of the virtual disk.

In some embodiments, virtualization environment 300 can also include virtual apertures (not shown) in a virtual memory space, which can be a virtual view of the virtual memory available to virtual machines 332. The virtual apertures can correspond to for example, caches, buffers, physical memories such as system memory 312, and graphic memory 314, internal or external physical disks such as hard disk 304. As an example, under the circumstances that applications running on virtual machine 332A do not require memory more than that is available in system memory 312; the virtual apertures of virtual machine 332A can correspond to a portion of system memory 312. As another example, under the circumstances that applications executed by virtual machine 332B requires memory more than that is available in system memory 312, the virtual apertures of virtual machine 332B can correspond to one or more portions of system memory 312, graphic memory 314, or even one or more portions of physical disks 304. The virtual apertures can be generated, provided, and managed by hypervisor 302.

Virtual processors 328A-C (collectively as 328) can be a virtualized view of one or more physical processors 308 of virtualization environment 300. In some embodiments, the virtualized view of the physical processors 308 can be generated, provided, and managed by hypervisor 302. In some embodiments, virtual processor 328 can have substantially the same characteristics as those of physical processors 308. In some embodiments, virtual processors 328 can provide a modified view of the physical processors 308 such that at least some of the characteristics of virtual processor 328 are different from the characteristics of the corresponding physical processors 308.

In FIG. 3, control operating system 320 can execute at least one application for managing and configuring the guest operating systems (domUs 330, e.g. domU-1 330A and domU-2 330B) executing on the virtual machines 332. In some embodiments, control operating system 320 can be referred to as control domain 320, domain 0 320, or dom0 320. While FIG. 3 shows that control operating system 320 is included in virtual machine 332A, control operating system 320 can be executed within any control virtual machine or any dom0 virtual machine, can be executed by hypervisor 302, or can be executed by operating system 318 executing hypervisor 302. Control operating system 320 can execute an administrative application or program that can further display a user interface, which administrators can use to access the functionality of each virtual machine 332 and/or to manage each virtual machine 332. In some embodiments, the user interface generated by the administrative program can be used to terminate the execution of virtual machines 332, allocate resources to virtual machines 332, assign permissions to virtual machines 332, or manage security credentials associated with virtual machines 332.

Moreover, in some embodiments, control operating system 320 can start new virtual machines 332 or terminate execution of virtual machines 332. Control operating system 320 can also directly access hardware and/or resources within the hardware layer 310. In some embodiments, control operating system 320 can interface with programs and applications executing within the context of a virtual machine 332. Control operating system 320 can also interface with programs and applications executing on the computing device in virtualization environment 300 that are outside of the context of a virtual machine 332.

Furthermore, in some embodiments, control operating system 320 can also interact with one or more guest operating systems 330. Control operating system 320 can communicate with guest operating systems 330 through hypervisor 302. As an example, guest operating systems 330 can communicate with control operating system 320 via a communication channel established by the hypervisor 302, such as via a plurality of shared memory pages made available by the hypervisor 302. In some embodiments, control operating system 320 can also include a network back-end driver (not shown) for communicating directly with networking hardware provided by virtualization environment 300. The network back-end driver can process at least one virtual machine request from at least one guest operating system 330. Control operating system 320 can also include a block back-end driver for communicating with a storage element included in virtualization environment 300, such as system memory 312 and graphic memory 314. In some embodiments, the block back-end driver can read and write data from the storage element based upon at least one request received from a guest operating system 330.

Control operating system 320 can also include a tools stack 324, which can provide functionality for interacting with the hypervisor 302. Tools stack 324 can include customized applications for providing improved management functionality to an administrator of a virtual machine farm. In some embodiments, at least one of tools stack 324 and control operating system 320 can include a management application programming interface (API) that provides an interface for remotely configuring and controlling virtual machines 332 running in virtualization environment 300.

As shown in FIG. 3, in some embodiments, guest operating systems 330 can provide users of virtualization environment 300 with access to resources within a computing environment. Such resources can include programs, applications, files, executable instruction codes, desktop environments, computing environment, or other resources made available to users of virtualization environment 300. In some embodiments, the resource can be delivered to virtualization environment 300 via a plurality of access methods including conventional direct installations in virtualization environment 300 or delivery via a method for application streaming. The resource can also be delivered to virtualization environment 300 via access methods such as delivery of output data generated by an execution of the resource on another computing device and communicated to virtualization environment 300 via a presentation layer protocol, delivery of output data generated by execution from a removable storage device connected to virtualization environment 300, and delivery of output data generated by execution via a virtual machine executing in virtualization environment 300.

Figure 4A:
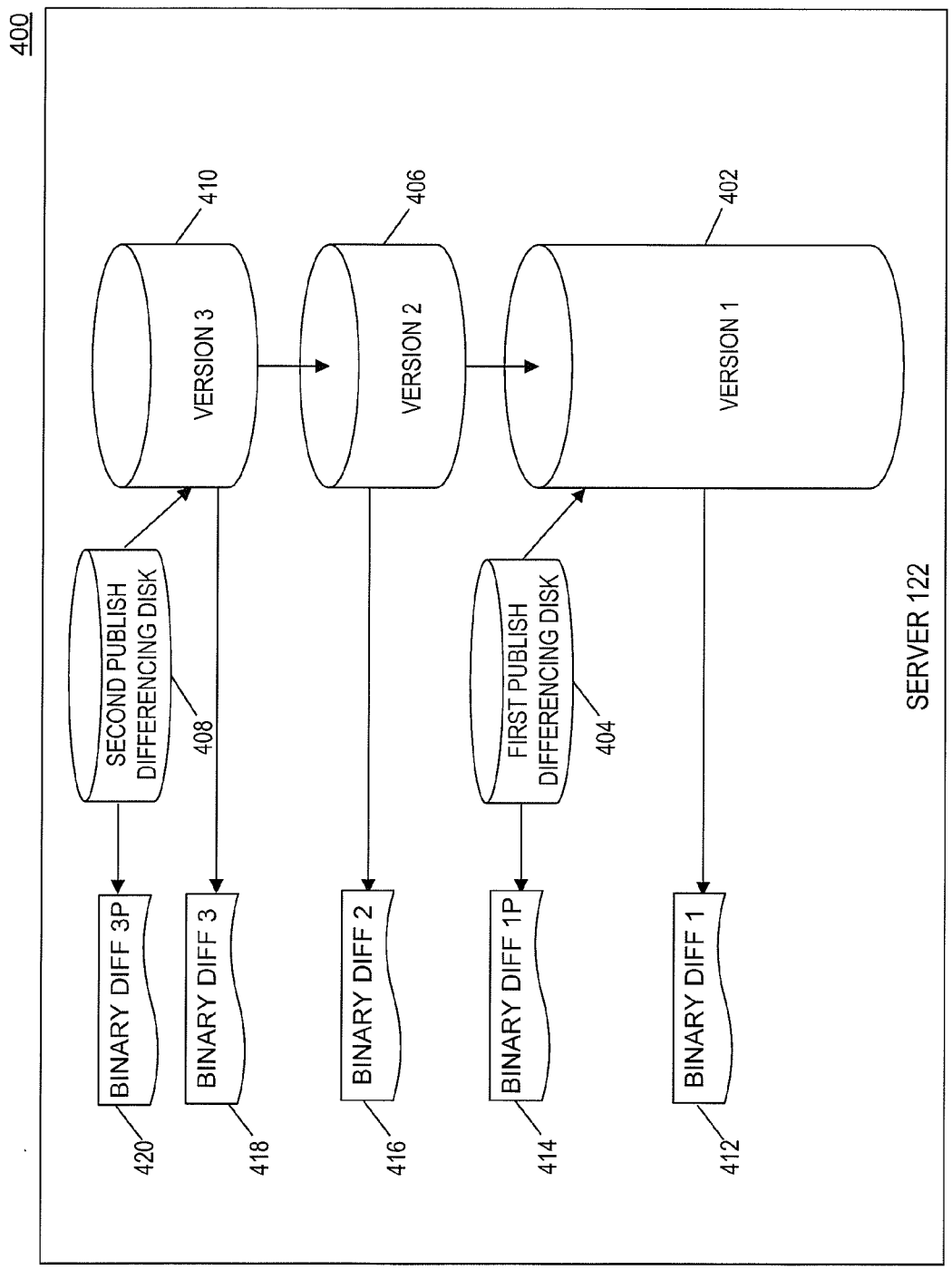
FIG. 4A is a block diagram of an exemplary virtual disk publishing process associated with a server, consistent with embodiments of the present disclosure.

FIG. 4A is a block diagram of an exemplary virtual disk publishing process 400 associated with a server. As shown in FIG. 4A, server 122 can provide a first mainline version (e.g., version 1 402) of a virtual disk in a repository of server 122. A mainline version of the virtual disk can be a central mainline version of the virtual disk provided by server 122. In some embodiments, the virtual disk can correspond to, for example, a system disk of a virtual machine of a client device (e.g., client device 102). Thus, a first mainline version of the virtual disk can include a central mainline version of the operating system. The first mainline version of the virtual disk is sometimes referred to as the base mainline version corresponding to the initial installation of a virtual machine executed by the client device. For example, server 122 can provide version 1 402 as an initial mainline version for installing the system disk of the virtual machine executed by the client device. After server 122 provides version 1 402, server 122 can generate a first publish differencing disk 404. A publish differencing disk can include any desired modification to enable a corresponding mainline version of the virtual disk to be executed by a client device. For example, a publish differencing disk can include modifications for uninstalling hypervisor-specific tools associated with the client device.

In some embodiments, virtual disks, such as version 1 402 and first publish differencing disk 404, can be implemented using any virtual disk technology supported by server 122. For example, version 1 402 and first publish differencing disk 404 can be implemented using the VHD format. Version 1 402 (i.e., a mainline version) can include, for example, system files and disk partitions for installing a virtual machine on the client device. First publish differencing disk 404 can include any desired modification to enable a version 1 402 to be executed by the client device. Version 1 402 and first publish differencing disk 404 can also include meta data, which can indicate, for example, which blocks and/or sectors of the virtual disk are modified from the previous version of the virtual disks.

In some embodiments, using the meta data associated with the version 1 402 and the meta data associated with first publish differencing disk 404, the server can identify which blocks and/or sectors can be included in one or more binary differencing patches. For example, if version 1 402 corresponds to the initial mainline version for installing the system disk of the virtual machine executed by the client device, server 122 can identify, using the meta-data associated with version 1 402, that all blocks and/or sectors in version 1 402 are modified (i.e., modified from an empty disk). In some embodiments, if there is a prior mainline version to version 1 402, server 122 can identify any modifications between version 1 402 and such prior mainline version. Moreover, using the meta-data associated with first publish differencing disk 404, server 122 can identify which blocks or sectors of version 1 402 correspond to the modifications included in first publish differencing disk 404. As discussed above, such modification can enable version 1 402 to be executed by a client device. In particular, as an example, to generate the binary differencing patches, for each 2 Mega-Byte block, server 122 can identify sectors that are modified or updated.

In some embodiments, after identification of the sectors using the corresponding meta data, server 122 can write these sectors in binary format to generate the one or more binary differencing patches. For example, using the meta data associated with version 1 402 and first publish differencing disk 404, server 122 can generate binary differencing patches 1 412 and binary differencing patches 1P 414. In some embodiments, server 122 can generate one or more binary differencing patches corresponding to the identified sectors while the identification of the remaining sectors are still in progress. In other words, the binary differencing patches can be generated on the fly. Binary differencing patches can be, for example, in VCDIFF generic differencing and compression data format (VCDIFF format), as described in the RFC 3284 standard. Server 122 can write the sectors via, for example, a synchronizer. A synchronizer can be a software and/or a hardware devices. Because server 122 has knowledge of the version of the virtual disk that the client device is currently executing, server 122 can thus provide the one or more binary differencing patches (e.g., binary differencing patches 1 412 and binary differencing patches 1P 414) to the client device to install or update the corresponding virtual disk.

As described above, version 1 402 can provide, for example, the initial mainline version for installing the system disk of the virtual machine executed by the client device. In some embodiments, after server 122 provides version 1 402, updates to version 1 402 can occur and such updates may need to be provided to the client device. As an example, a system file can be modified or an additional application or process can be started. As another example, an update can include a hot-fix or an operating system service pack. As a result, server 122 can provide new mainline versions, such as version 2 406 and version 3 410, so that the virtual machines of the client device can be updated. In some embodiments, the new mainline version of the virtual disk can include the disk modifications from a prior mainline version. For example, version 2 406 can include disk modifications from version 1 402; and version 3 410 can include disk modifications from version 2 406. Server 122 can generate binary differencing patches corresponding to theses disk modification and provide them to the client device. The generation of the binary differencing patches is further described in detail below.

In some embodiments, server 122 can provide another publish differencing disk corresponding to the new mainline version. But in some embodiments, it may not. For example, if it is not desired to provide version 2 406 immediately to the client devices, modifications to enable the client devices to execute version 2 406 may not be required, and thus server 122 may not provide a publish differencing disk corresponding to version 2 406. Server 122 can instead provide a second publish differencing disk 408 corresponding to version 3 410. Second publish differencing disk 408 can correspond to modifications to enable the client devices to execute version 3 410. In some embodiments, to enable such execution, server 122 provides version 2 406, version 3 410, and second publish differencing disk 408 to the client device in binary differencing patches.

In some embodiments, virtual disks, such as virtual disks corresponding to version 2 406 and version 3 410, and second publish differencing disk 408, can be implemented using any virtual disk technology supported by server 122. For example, the new mainline versions, (e.g., version 2 406 and version 3 410) and second publish differencing disk 408 can be implemented in the VHD format. Similar to version 1 402, version 2 406 and version 3 can include, for example, system files and disk partitions for updating a virtual machine executed by the client device. Version 2 406, version 3 410, and second publish differencing disk 408 can also include meta data, which can indicate, for example, which blocks and/or sectors are modified or updated. As an example, using the meta data associated with version 2 406, server 122 can identify which blocks or sectors of version 1 402 are modified for version 2 406. In particular, for example, using the meta data, for each 2 Mega-Byte block, server 122 can identify sectors that are modified or updated from version 1 402. Similarly, using the meta data associated with version 3 410, server 122 can identify which blocks or sectors of version 2 406 are modified for version 3 410. And using the meta data associated with second publish differencing disk 408, server 122 can identify which blocks and/or sectors of version 2 406 correspond to the modifications included in second publish differencing disk 408. Such modification can enable version 3 410 to be executed by a client device. Server 122 can use the identified blocks and/or sectors to generate one or more binary differencing patches, which is further described below.

In some embodiments, version 3 410 and second publish differencing disk 408 can be provided for testing, sometimes also referred to staging. For example, under some circumstances, a user may wish to test the modifications or updates made to version 2 406 before version 3 410 is published. Server 122 can then mark version 3 410 as a staged version such that only designated client devices can receive version 3 410 and second publish differencing disk 408 for testing purposes. After the designated client devices perform the test of version 3 410, version 3 410 and second publish differencing disk 408 can be published and provided to other client devices. In some embodiments, version 3 410 and second publish differencing disk 408 can be published and provided to one or more client devices without testing or staging.

In some embodiments, modifications or updates provided to a current mainline version (e.g., version 2 406) of the virtual disk may not be provided to the client device. As discussed above, version 3 410 can include modifications or updates of version 2 406. Under some circumstances, server 122 can determine, for example, not to provide version 2 406. As a result, server 122 does not generate a publish differencing disk corresponding to the modifications of version 2 406 to enable execution of version 2 406 on the client device. In some embodiments, version 2 406 can be used, for example, as a check point by server 122.

In some embodiments, modifications or updates to a current version of the virtual disk can be rolled back. As an example, a version 4 (not shown) of the virtual disk can become available after version 3 410 is generated. For any reasons, server 122 can determine that the version 4 needs to be deleted because the version 4 is, for example, broken, invalid, or otherwise undesired. Server 122 can thus delete the version 4 and rollback to version 3 410. As shown in FIG. 4A, as an example, as a result of the version 4 being rolled back to version 3 410, the current version of the virtual disk can thus be version 3 410. Server 122 can thus generate one or more binary differencing patches using version 3 410, which corresponds to modifications of version 2 406, and second publish differencing disk 408, which corresponds to modifications of version 3 410. For example, to generate the binary differencing patches, for each 2 Mega-Byte block, server 122 can identify sectors that are modified or updated. In some embodiments, after identification of the sectors using the corresponding meta data, server 122 can write these sectors in binary format to generate the one or more binary differencing patches. For example, using the meta data associated with version 2 406, version 3 410, and second publish differencing disk 408, server 122 can generate binary differencing patches 2 416, binary differencing patches 3 418, and binary differencing patches 3P 420.

In some embodiments, server 122 can generate one or more binary differencing patches corresponding to the identified sectors while the identification of the remaining sectors are still in progress. In other words, the binary differencing patches can be generated on the fly. Binary differencing patches can be, for example, in VCDIFF generic differencing and compression data format (VCDIFF format), as described in the RFC 3284 standard. Server 122 can write the sectors via, for example, a synchronizer. Because server 122 can have knowledge of the version of the virtual disk that the client device is currently executing, server 122 can thus provide the one or more binary differencing patches (e.g., binary differencing patches 2 416, binary differencing patches 3 418, and binary differencing patches 3P 420) to the client device to update the corresponding virtual disk. In some embodiments, server 122 can also combine binary difference patches 2 416 and binary differencing patches 3 418 before providing them to the client device.

Figure 4B:
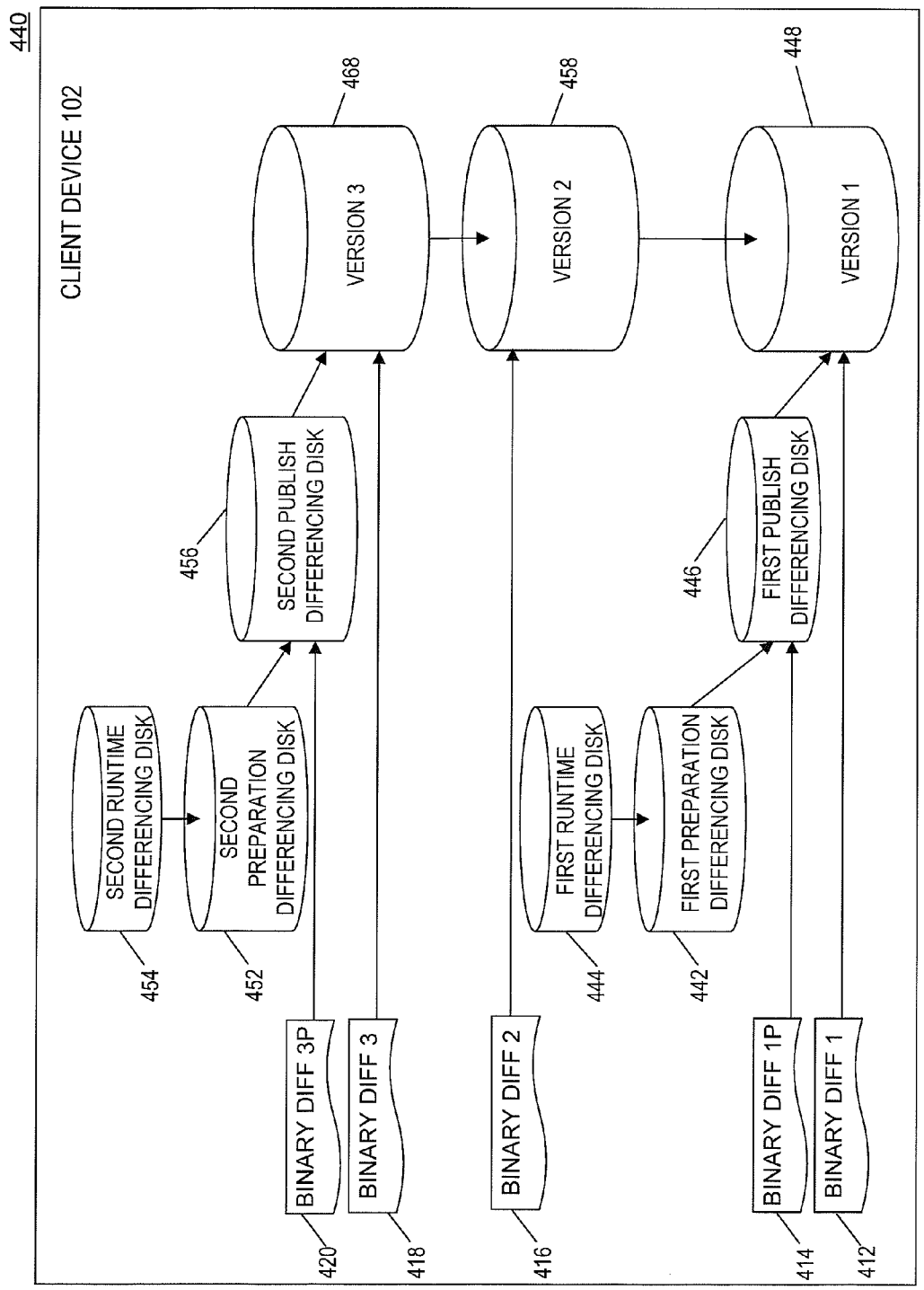
FIG. 4B is a block diagram of an exemplary virtual disk updating process associated with a client device, consistent with embodiments of the present disclosure.

FIG. 4B is a block diagram of an exemplary virtual disk updating process 440 associated with a client device. As described above, in some embodiments, client device 102 can obtain, such as download, one or more binary differencing patches from the server (e.g., server 122). The one or more binary differencing patches can correspond to a new mainline version of the system disk of a virtual machine of client device 102, and a corresponding publish differencing disk. As an example, for an initial installing or deploying of a virtual machine on client device 102, client device 102 can download binary differencing patches 1 412 that corresponds to the initial mainline version of the system disk and binary differencing patches 1P 414 that corresponds to modifications of the initial mainline version for enabling execution on the client device.

After downloading binary differencing patches 1 412 and binary differencing patches 1P 414, client device 102 can generate a first virtual disk corresponding to the first mainline version, e.g., version 1 448, and first publish differencing disk 446. For example, client device 102 can provide a first empty differencing disk for the mainline version and apply binary differencing patches 1 412 to convert the first empty differencing disk to version 1 448. Similarly, client device 102 can provide a second empty differencing disk and apply binary differencing patches 1 414 to convert the second empty differencing disk to first publish differencing disk 446. Virtual disks, such as version 1 448 and first publish differencing disk 446, can be implemented using any virtual disk technology supported by client device 102. For example, they can be implemented using the VMDK format.

Moreover, client device 102 can also provide a first preparation differencing disk 442 and a first runtime differencing disk 444. In some embodiments, client device 102 can use first preparation differencing disk 442 to receive the localized preparation changes. For example, client device 102 can provide a third empty differencing disk on top of first publish differencing disk 446. After receiving the local preparation changes that can personalize the virtual machine for a particular user, client device 102 can apply those local preparation changes and thus convert the third empty differencing disk to first preparation differencing disk 442. Moreover, in some embodiments, client device 102 can use first runtime differencing disk 444 to store changes made at the virtual machine's runtime. For example, client device 102 can provide a fourth empty differencing disk on top of first preparation differencing disk 442. While a virtual machine of client device 102 is running, runtime changes may be made and stored in this fourth empty differencing disk, which becomes first runtime differencing disk 444. In some embodiments, after each reboot of the virtual machines, runtime changes may no longer be needed and thus may be discarded after each reboot. Virtual disks, such as first preparation differencing disk 442 and first runtime differencing disk 444, can be implemented using any virtual disk technology supported by client device 102. For example, first preparation differencing disk 442 and first runtime differencing disk 444 can be implemented using the VMDK format.

In some embodiments, client device 102 can download the one or more binary differencing patches corresponding to a particular virtual machine executed by client device 102, and apply them to provide system disks. As described above, a system disk can include updates of the system files, processes, application, service packs, etc. As shown in FIG. 4B, using binary differencing patches 1 412 and binary differencing patches 1P 414, client device 102 can generate version 1 448 and first preparation differencing disk 446, which can correspond to version 1 402 and first publish differencing disk 404 of server 122 shown in FIG. 4A, respectively. After also generating first preparation differencing disk 442 and first runtime differencing disk 444, client device 102 can use these disks to execute the virtual machine.

In some embodiments, client device 102 can download one or more binary differencing patches corresponding to the updates of the mainline versions of a system disk of a virtual machine on client device 102. For example, client device 102 can download binary differencing patches 2 416, binary differencing patches 3 418, and binary differencing patches 3P 420. After downloading these binary differencing patches, client device 102 can generate a version 2 458, a version 3 468, and a second preparation differencing disk 452, respectively. For example, client device 102 can provide a fifth and sixth empty differencing disks for the mainline versions and apply binary differencing patches 2 416 and binary differencing patches 3 418 to convert the fifth and sixth empty differencing disks to version 2 458 and version 3 468, respectively. Similarly, client device 102 can provide a seventh empty differencing disk and apply binary differencing patches 3P 420 to convert the seventh empty differencing disk to second publish differencing disk 456. Virtual disks, such as version 2 458, version 3 468, and second publish differencing disk 456, can be implemented using any virtual disk technology supported by client device 102. For example, they can be implemented using the VMDK format. Version 2 458 can be generated on top of version 1 448 (i.e., the prior mainline version), and version 3 468 can be generated on top of version 2 458. Corresponding to those in server 122, version 2 458 can include disk modifications from version 1 448; and version 3 468 can include disk modifications from version 2 458. Second binary differencing disk 452 can include modifications of version 3 468 for enabling execution on client device 102. In some embodiments, binary differencing patches 2 416 and binary differencing patches 3 418 can be combined, and thus client device 102 can generate a combined version 2-3 (not shown).

In some embodiments, client device 102 can also generate a second preparation differencing disk 452 and a second runtime differencing disk 454. For example, client device 102 can provide an eighth empty differencing disk on top of second publish differencing disk 456. After receiving the local preparation changes that can personalize the virtual machine for a particular user, client device 102 can convert the eighth empty differencing disk to second preparation differencing disk 452. Moreover, in some embodiments, client device 102 can use second runtime differencing disk 454 to receive changes made at the virtual machine's runtime. For example, client device 102 can provide a ninth empty differencing disk on top of second preparation differencing disk 452. While a virtual machine of client device 102 is running, runtime changes can be made and stored in this ninth empty differencing disk, which becomes second runtime differencing disk 454. In some embodiments, after each reboot of the virtual machines, runtime changes may no longer be needed and thus may be discarded after each reboot. Virtual disks, such as second preparation differencing disk 452 and second runtime differencing disk 454, can be implemented using any virtual disk technology supported by client device 102. For example, they can be implemented using the VMDK format.

In some embodiments, client device 102 can download the one or more binary differencing patches and apply them to provide updates of a system disk and/or a user disk. As described above, a system disk can include updates of the system files, processes, application, service packs, etc. As shown in FIG. 4B, using binary differencing patches 2 416, binary differencing patches 3 418, and binary differencing patches 3P 420, client device 102 can generate version 2 458, version 3, 468, and second preparation differencing disk 456, which can correspond to version 2 406, version 3, 410, and second publish differencing disk 408 of server 122 shown in FIG. 4A, respectively. Moreover, after generating second preparation differencing disk 452 and second runtime differencing disk 454, client device 102 can use these disks to execute the virtual machine.

In some embodiments, client device 102 can prepare a new virtual machine to execute an updated version of the system disks while the virtual machine still executing a current version. For example, while the virtual machine is still executing the current version by using disks including version 1 448, first publish differencing disk 446, first preparation differencing disk 442, and first runtime differencing disk 444, client device 102 can download binary differencing patches 2 416, 3 418, and 3P 420, and prepare virtual disks including version 2 458, version 3 468, second preparation differencing disk 456, second preparation differencing disk 452, and second runtime differencing disk 454. After the virtual disks of the updated version is prepared, client device 102 can boot the new virtual machine by using the virtual disks associated with the updated version of the system disks with limited memory size and/or limited or no network availability.

In some embodiments, the new virtual machine that executes the updated version of the system disk can co-exist with the current virtual machine that uses the current version of the system disks. Moreover, the new virtual machine can also use Plug-n-Play (PnP) to install virtual devices such as emulated devices, disks, network, and mouse. The new virtual machine can also perform user personalization including configuring user's workgroup and creating the user's domain account profile.

In some embodiments, after client device 102 prepares, such as boots, the new virtual machine using the virtual disks associated with the updated version of the system disks, client device 102 can delete the virtual disks associated with the old version of the system disks. For example, after booting using the virtual disks associated with version 3 468, client device 102 can delete first preparation differencing disk 442, first runtime differencing disk 444, and first publish differencing disk 446. In some embodiments, after the new virtual machine is booted, the old mainline version (e.g., version 1 448) of the system disk can be merged or combined with the updated mainline version (e.g., version 2 458 and version 3 468) of the system disk, so that the combined version represents the current version of the system disk.

In some embodiments, client device 102 can receive one or more binary differencing patches representing updates of more than one version of the system disk. For example, client device 102 can have version 1 448 as its current mainline version of the system disk. Under some circumstances (e.g., network congestion or network interruption), version 1 448 may not be updated for a period of time during which server 122 publishes version 2 458 and version 3 468 of the system disk. As a result, client device 102 can receive binary differencing patches representing, for example, differences between multiple mainline versions (e.g., between versions 3 468 and version 2 458, and between versions 2 458 and version 1 448) of the system disk or a chain of updates of the system disk. Client device 102 can thus download all the differences in binary format (e.g., combined binary differencing patches 2-3, not shown) and apply them to generate the one or more mainline versions (e.g., version 2 458 and version 3 468, or a combine version 2-3, not shown).

In some embodiments, client device 102 may not be executing any version of a virtual machine while server 122 has already provided multiple mainline versions. Client device 102 can thus receive binary differencing patches representing, for example, differences between multiple mainline versions (e.g., between versions 3 and 2, between versions 2 and 1, and between version 1 and an empty disk) of the system disk or a chain of updates of the system disk. Client device 102 can thus download all the differences in binary format (e.g., combined binary differencing patches 1-3, not shown) and apply them to generate one or more mainline versions (e.g., version 1 448, version 2 458, and version 3 468, or a combine version 1-3, not shown).

Figure 4C:
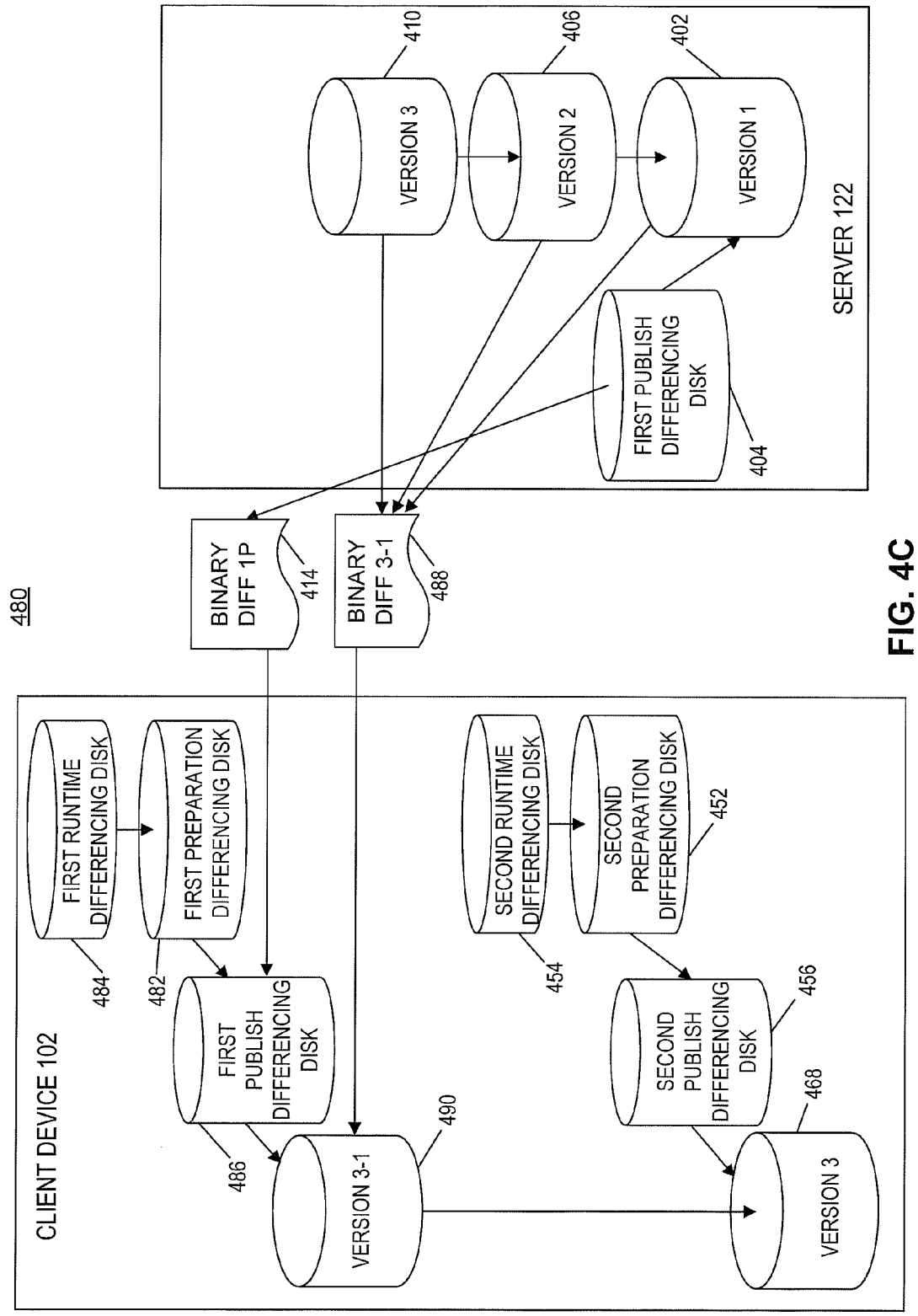
FIG. 4C is a block diagram of an exemplary virtual disk update reverting process, consistent with embodiments of the present disclosure.

FIG. 4C is a block diagram of an exemplary virtual disk update reverting process 480. In some embodiments, server 122 can determine that an updated mainline version is not desirable. For example, server 122 can determine that version 3 410 is corrupted, invalid, or otherwise undesired. If an update mainline version is not desired, server 122 can perform an update reverting process. An update reverting process can reverse the provisioning updates previously provided to one or more client devices, e.g., client device 102.

For example, as shown in FIG. 4C, server 122 can determine that version 3 410, or any other mainline versions, is not desired. After determining version 3 410 is not desired, server 122 can reverse, restore, or rollback version 3 410 to version 1 402, or any other previous mainline version. As described above, version 3 410 and version 1 402 can be implemented using any virtual disk technology supported by server 122. For example, version 3 410 and version 1 402 can be implemented using the VHD format. Moreover, version 3 410, version 1 402, and any intervening versions (e.g., version 2 406) can include meta data, which can indicate, for example, which blocks and/or sectors of the virtual disk are modified from the previous version of the virtual disks. In some embodiments, using the meta data associated with the version 1 402/version 2 406 and/or the meta data associated with version 3 410, server 122 can identify which blocks and/or sectors can be included in one or more binary differencing patches that represent the reverting update, e.g., binary differencing patch 3-1 488.

In some embodiments, in update reverting process 480, server 122 can also provide one or more binary differencing patches corresponding to first publish differencing disk 404, or any publish differencing disk associated with the corresponding mainline version that server 122 reverts back to. As described above, a publish differencing disk (e.g., first publish differencing disk 404) can include any desired modification to enable a corresponding mainline version (e.g., version 1 402) of the virtual disk to be executed by a client device. Using the meta-data associated with first publish differencing disk 404, server 122 can identify which blocks or sectors of version 1 402 correspond to the modifications included in first publish differencing disk 404.

In some embodiments, after identification of the sectors using the corresponding meta data, server 122 can write these sectors in binary format to generate the one or more binary differencing patches. For example, using the meta data associated with version 3 410 and/or version 1 402/version 2 406, server 122 can generate binary differencing patches 3-1 488. Similarly, using the meta data associated with first publish differencing disk 404, server 122 can generate binary differencing patches 1P 414. In some embodiments, server 122 can generate one or more binary differencing patches corresponding to the identified sectors while the identification of the remaining sectors are still in progress. In other words, the binary differencing patches can be generated on the fly. Binary differencing patches can be, for example, in VCDIFF generic differencing and compression data format (VCDIFF format), as described in the RFC 3284 standard. Server 122 can write the sectors via, for example, a synchronizer. Because server 122 has knowledge of the version of the virtual disk that the client device is currently executing, server 122 can thus provide the one or more binary differencing patches (e.g., binary differencing patches 3-1 488 and binary differencing patches 1P 414) to client device 102 for performing an update reverting process.

In some embodiments, after providing the one or more binary differencing patches (e.g., binary differencing patches 3-1 488 and binary differencing patches 1P 414), server 122 can delete or discard the mainline versions that are no longer desired. For example, after server 122 reverts back from version 3 410 to version 1 402, it can delete version 3 410 and version 2 406, and any other virtual disks associated with the deleted mainline versions.

As shown in FIG. 4C, based on the one or more binary differencing patches that represent the reverting update, client device 102 can revert to, restore, rollback to, or otherwise convert to a previous mainline version. As an example, client device 102 can download binary differencing patches 3-1 488 that corresponds to differences for converting version 3 468 to a version 1 (e.g., version 1 448 shown in FIG. 4B) and download binary differencing patches 1P 414 that corresponds to modifications for enabling execution version 1 448 on client device 102.

After downloading binary differencing patches 3-1 488, client device 102 can provide an empty virtual disk (not shown) on top of the current mainline version, e.g., version 3 468. Client device 102 can apply binary differencing patches 3-1 488 to the empty virtual disk and generate version 3-1 490. Version 3-1 490 can thus include differences for converting version 3 468 to version 1 448. Moreover, client device 102 can also generate first publish differencing disk 486, first preparation differencing disk 482, and first runtime differencing disk 484 in a similar or substantially similar manner to that of first publish differencing disk 446, first preparation differencing disk 442, and first runtime differencing disk 444, respectively, as described above. Therefore, details of the generation of these virtual disks are not repeated. After these virtual disks associated with version 3-1 490 are prepared, client device 102 can boot the new virtual machine to version 1 448 (shown in FIG. 4B, i.e., revert back to version 1 448) by using these virtual disks associated with the version 3-1 490 with limited memory size and/or limited or no network availability.

In some embodiments, after client device 102 prepares, such as boots, the new virtual machine to version 1 448 of the system disk, client device 102 can delete the virtual disks associated with the old version of the system disk. For example, after booting to version 1 448, client device 102 can delete the virtual disks associated with version 3 468, e.g., second publish differencing disk 456, second preparation differencing disk 452, and second runtime differencing disk 454. In some embodiments, after the new virtual machine is booted, the old mainline version (e.g., version 3 468) of the system disk can be merged or combined with the update reverting mainline version (e.g., version 3-1 490) of the system disk, so that the combined version represents the reverted mainline version (e.g., version 1 448) of the system disk. Moreover, server 122 and/or client device 102 can also delete one or more binary differencing patches 3-1 488 and one or more binary differencing patches 1P 414 after client device 102 reverts back to version 1 448.

While FIGS. 4A-4C are described largely with respect to a system disk of a virtual machine executed by client device 102 and its various versions published by server 122, it is appreciated that the above description can also apply to any other virtual disk that is desired.

Figure 5A:
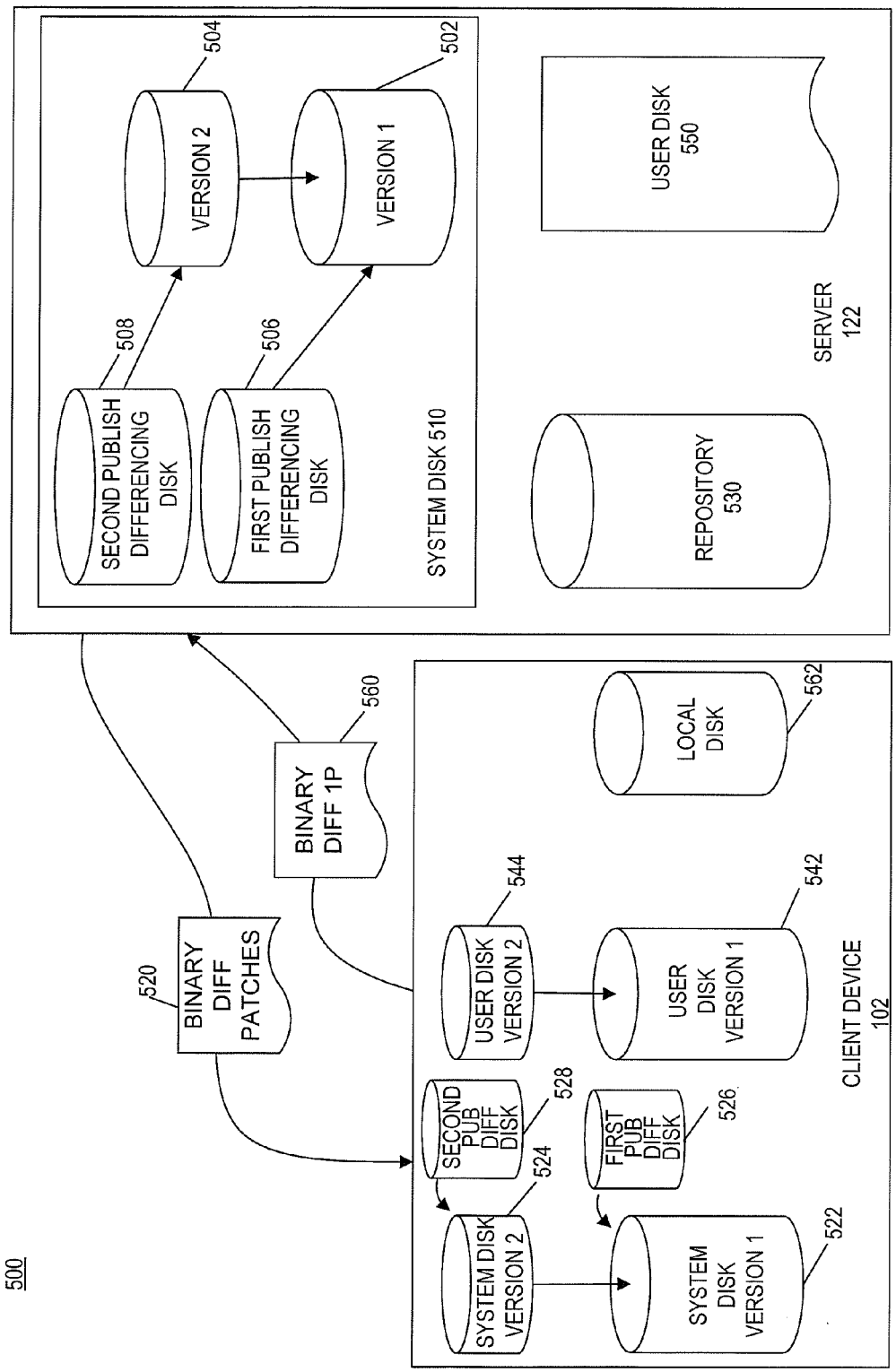
FIG. 5A is a block diagram illustrating a communication system for virtual disk provisioning using binary differencing patches, consistent with embodiments of the present disclosure.

FIG. 5A is a block diagram illustrating a communication system 500 for virtual disk provisioning using binary differencing patches. As shown in FIG. 5A, communication system 500 can include server 122, which can communicate with client device 102. Client device 102 can also provide one or more virtual machines (e.g., virtual machines 332B-C). The one or more virtual machines can include one or more virtual disks (e.g., virtual disks 326A). A virtual disk can include at least one of a system disk (e.g., system disk version 1 522), a user disk (e.g., user disk version 1 542), and a local disk 562. As described above, in some embodiments, the system disk and the user disk can be synchronized with server 122, while local disk 562 may not be synchronized. Local disk 562 can store local data associated with a virtual machine (e.g., virtual machine 332A). Local disk 562 can also include persistent user data. In some embodiments, the persistent user data stored on a local disk may not be synchronized.

As shown in FIG. 5A, in some embodiments, the system disks of client device 102 can be synchronized with server 122. In particular, as described above, server 122 can include mainline versions (e.g., a version 1 502 and a version 2 504 of a virtual disk, such as system disk 510 that corresponds to the system disk of a virtual machine executed by client device 102. Server 122 can also provide a first publish differencing disk 506 a second publish differencing disk 508 corresponding to the modifications of version 1 502 and version 2 504, respectively. Such modifications can enable the execution of the corresponding mainline versions on client device 102. In some embodiments, virtual disks, such as version 1 502, version 2 504, first publish differencing disk 506, and second publish differencing disk 506, can be implemented using any virtual disk technology supported by server 122. For example, these disks can be implemented using the VHD format. Version 1 502 (i.e., a mainline version) can include, for example, system files and disk partitions for installing a virtual machine on the client device. And version 2 504 can include modifications of version 1 502.

In some embodiments, virtual disks, such as version 1 502, version 2 504, first publish differencing disk 506, and second publish differencing disk 506, can also include meta data, which can indicate, for example, which blocks and/or sectors are modified or updated. As an example, using the meta data associated with version 1 502 and version 2 504, server 122 can identify which blocks or sectors of an empty disk or version 1 502 are modified, respectively. In particular, for example, using the meta data, for each 2 Mega-Byte block, server 122 can identify sectors that are modified or updated from version 1 502 of the virtual disk. Similarly, using the meta data associated with first publish differencing disk 506 and second publish differencing disk 508, server 122 can identify which blocks and/or sectors of version 1 502 and version 2 404, respectively, correspond to the modifications. Such modifications can enable version 1 502 and version 2 504 to be executed by client device 102. Server 122 can use the identified blocks and/or sectors to generate one or more binary differencing patches.

In some embodiments, after identifying sectors that are modified, server 122 can generate one or more binary differencing patches 520 corresponding to the identified sectors. In some embodiments, server 122 can generate one or more binary differencing patches 520 corresponding to the identified sectors while the identification of the remaining sectors are still in progress. In other words, binary differencing patches 520 can be generated on the fly. Binary differencing patches 520 can be, for example, in the VCDIFF generic differencing and compression data format (the VCDIFF format), as described in the RFC 3284 standard. Server 122 can write the sectors via, for example, a synchronizer. Because server 122 can have knowledge of the version of the virtual disk that the client device is currently executing, server 122 can thus provide the one or more binary differencing patches (e.g., binary differencing patches 520) to the client device to update the corresponding virtual disk.

In some embodiments, after generating binary differencing patches 520, server 122 can store binary differencing patches 520 in a repository 530. As described above, in some embodiments, client device 102 can download one or more binary differencing patches 520 from repository 530 and generate the corresponding mainline versions (e.g., system disk version 1 522 and system disk version 2 524), and first publish differencing disk 526 and second publish differencing disk 528. Moreover, similar to those described above, client device 102 can also generate preparation differencing disks (not shown) for receiving the local preparation changes that can personalize the virtual machine for a particular user, and runtime differencing disks (not shown) for receiving changes made at the virtual machine's runtime. The preparation differencing disks and runtime differencing disks can be implemented in any virtual disk technology supported by client device 102, e.g., the VMDK format.

In some embodiments, client device 102 can prepare a new virtual machine to execute an updated version (e.g., system disk version 2 524 and second publish differencing disk 528), while the virtual machine still executes a current version (e.g., system disk version 1 522 and first publish differencing disk 526). For example, while the virtual machine is still executing the current version by using disks including system disk version 1 522 and first publish differencing disk 526, client device 102 can download binary differencing patches 520; and prepare disks including system disk version 2 524, second preparation differencing disk 528, and the corresponding preparation differencing disk and runtime differencing disk. After the updated version is prepared, client device 102 can boot the new virtual machine by using the disks associated with the updated version of the system disks with limited memory size and/or limited or no network availability.

In some embodiments, the new virtual machine that executes the updated version of the system disk can co-exist with the current virtual machine that uses the current version of the system disks. Moreover, the new virtual machine can also use Plug-n-Play (PnP) to install virtual devices such as emulated devices, disks, network, and mouse. The new virtual machine can also perform user personalization including configuring user's workgroup and creating the user's domain account profile.

In some embodiments, after client device 102 prepares, such as boots, the new virtual machine using the virtual disks associated with the updated version of the system disks, client device 102 can delete virtual disks associated with the old version of the system disks. For example, client device 102 can delete the preparation differencing disk, the runtime differencing disk, and first publish differencing disk 526. In some embodiments, after the new virtual machine is booted, the old mainline version, (e.g., system disk version 1 522), can be merged or combined with the updated mainline version (e.g., system disk version 2 524) of the system disk, so that the combined version represents the current version of the system disk.

In some embodiments, client device 102 can receive one or more binary differencing patches representing updates of more than one version of the system disk. For example, client device 102 can have system disk version 1 522 as its current version of the system disk. Under some circumstances (e.g., network congestion or network interruption), system disk version 1 522 may not be updated for a period of time during which server 122 publishes system disk versions 2 524 and a system disk version 3 (not shown). As a result, client device 102 can receive binary differencing patches representing, for example, differences between multiple mainline versions (e.g., version 3 and version 2 524, and version 2 524 and version 1 522) of the system disk or a chain of updates of the system disk. Client device 102 can thus download all the differences in binary format (e.g., VCDIFF format) and combine or merge these differences between multiple mainline versions of the system disk to generate a combined system disk version 1-3 (not shown).

As shown in FIG. 5A, communication system 500 can also provide a backup of a user disk using binary differencing patches. In some embodiments, client device 102 can perform an initial backup and/or subsequent backups of the user disk. As an example, client device 102 can transmit binary differencing patches corresponding to user disk version 1 542, which can represent a first backup version of the user disk, to server 122. As another example, client device 102 can also transmit binary differencing patches corresponding to subsequent backup versions of the user disk, e.g., user disk version 2 544 and any other user disk versions (not shown).

In some embodiments, user disk version 1 542, user disk version 2 544, and any other user disk backup versions, can be, for example, copies, snapshots, or virtual disk files of the user disk at certain time points, such as at certain backup times. Because the user data stored in the user disk can continuously change, client device 102 can capture the user data stored in the user disk at a time point for backup. As an example, to generate an initial backup, client device 102 can provide an empty differencing disk (not shown) on top of user disk version 1 542 at a first backup time. Client device 102 can thus store any modifications of user disk version 1 542 that are generated after the first backup time in the empty differencing disk. As a result, user disk version 1 542 is not modified after the first backup time and user disk version 1 542 can thus represent the first backup version of the user disk associated with the first backup time. In some embodiments, client device 102 can convert the empty differencing disk to user disk version 2 544 based on the stored modifications. User disk version 2 544 can store, for example, modifications of user disk version 1 542 generated after the first backup time.

As another example, to generate a subsequent backup, client device 102 can provide another empty differencing disk (not shown) on top of user disk version 2 544 at a later time point, such as a second backup time. Client device 102 can store any modifications of user disk version 2 544 generated after the second backup time in another empty differencing disk. As a result, user disk version 2 544 is not modified after the second backup time and user disk version 2 544 can thus represent the second backup version of the user disk associated with the second backup time. In some embodiments, client device 102 can convert another empty differencing disk to a user disk version 3 (not shown), which can store, for example, modifications from user disk version 2 544 generated after the second backup time. It is appreciated that any number of backup versions of the user disk can be generated in any manner that is desired. In some embodiments, client device 102 can combine or merge one or more backup versions of the user disk.

In some embodiments, user disk version 1 542, user disk version 2 544, and any subsequent backup versions of the user disk can be implemented using any virtual disk technology supported by client device 102. For example, they can be implemented using the VMDK format. The backup versions of the user disk can include, for example, user data. They can also include meta data, which can indicate which blocks and/or sectors are modified. For example, meta data associated with user disk version 2 544 can indicate which blocks and/or sectors of user disk version 1 542 correspond to the modification stored in user disk version 2 544. In some embodiments, using the meta data associated with user disk version 1 542, user disk version 2 544, and any backup versions of the user disk, client device 102 can identify which blocks and/or sectors can be included in one or more binary differencing patches representing the corresponding backup versions. In particular, as an example, for each 2 Mega-Byte block, client device 102 can identify sectors in user disk version 2 544 that can be included in the one or more binary differencing patches representing user disk backup version 2 544 (e.g., binary differencing patches 560).

In some embodiments, after identifying sectors that are modified for one or more blocks, client device 102 can generate one or more binary differencing patches 560 corresponding to the identified sectors. As an example, client device 102 can generate binary differencing patches corresponding to each of the user disk backup versions, e.g., user disk version 1 542, user disk version 2 544, and any backup versions of the user disk. As another example, client device 102 can combine the one or more binary differencing patches corresponding to different user disk backup versions (e.g. binary differencing patches 560 can represent combined binary differencing patches corresponding to user disk version 1 542 and user disk version 2 544).

In some embodiments, client device 102 can generate one or more binary differencing patches 560 corresponding to the identified sectors while the identification of the remaining sectors are still in progress. In other words, binary differencing patches 560 can be generated on the fly. Binary differencing patches 560 can be, for example, in VCDIFF format, as described in the RFC 3284 standard. In some embodiments, binary differencing patches 560 can be generated by performing a differencing operation using binary data stored on physical disks. The stored binary data can correspond to different backup versions of the user disk, e.g., user disk version 2 544 and user disk version 1 542.

After generating binary differencing patches 560, client device 102 can transmit binary differencing patches 560, to server 122. After receiving binary differencing patches 560, server 122 can store them in a repository 530. As described above, client device 102 can generate binary differencing patches corresponding to each of the user disk backup versions. In some embodiments, one or more binary differencing patches 560 can also be combined such that the series of backup versions can be rolled up. For example, server 122 can provide a user disk 550 and apply the one or more binary differencing patches 560 corresponding to each of the user disk backup versions to user disk 550. In some embodiments, user disk 550 can be initially empty. Server 122 can thus apply the one or more binary differencing patches 560 to the empty user disk 550 so that user disk 550 stores the series of backup versions of the user disk of client device 102. User disk 550 can be implemented by any virtual disk technology supported by server 122. For example, user disk 550 can be implemented using the VHD format. Using user disk 550 that stores the series of backup versions of the user disk of client device 102 and meta data associated with user disk 550, server 122 can identify which blocks and/or sectors can be included in combined binary differencing patches (not shown) that represents the combined series of backup versions of the user disk of client device 102. In some embodiments, the combined binary differencing patches, which can represent the series of backup versions that are rolled up, can be configured in ascending block order. In some embodiments, the uncombined and/or combined binary differencing patches can be transmitted back to client device 102 to restore a desired backup version of the user disk of client device 102. Restoring, or re-provisioning, of the user disk is further described in detail below.

Figure 5B:
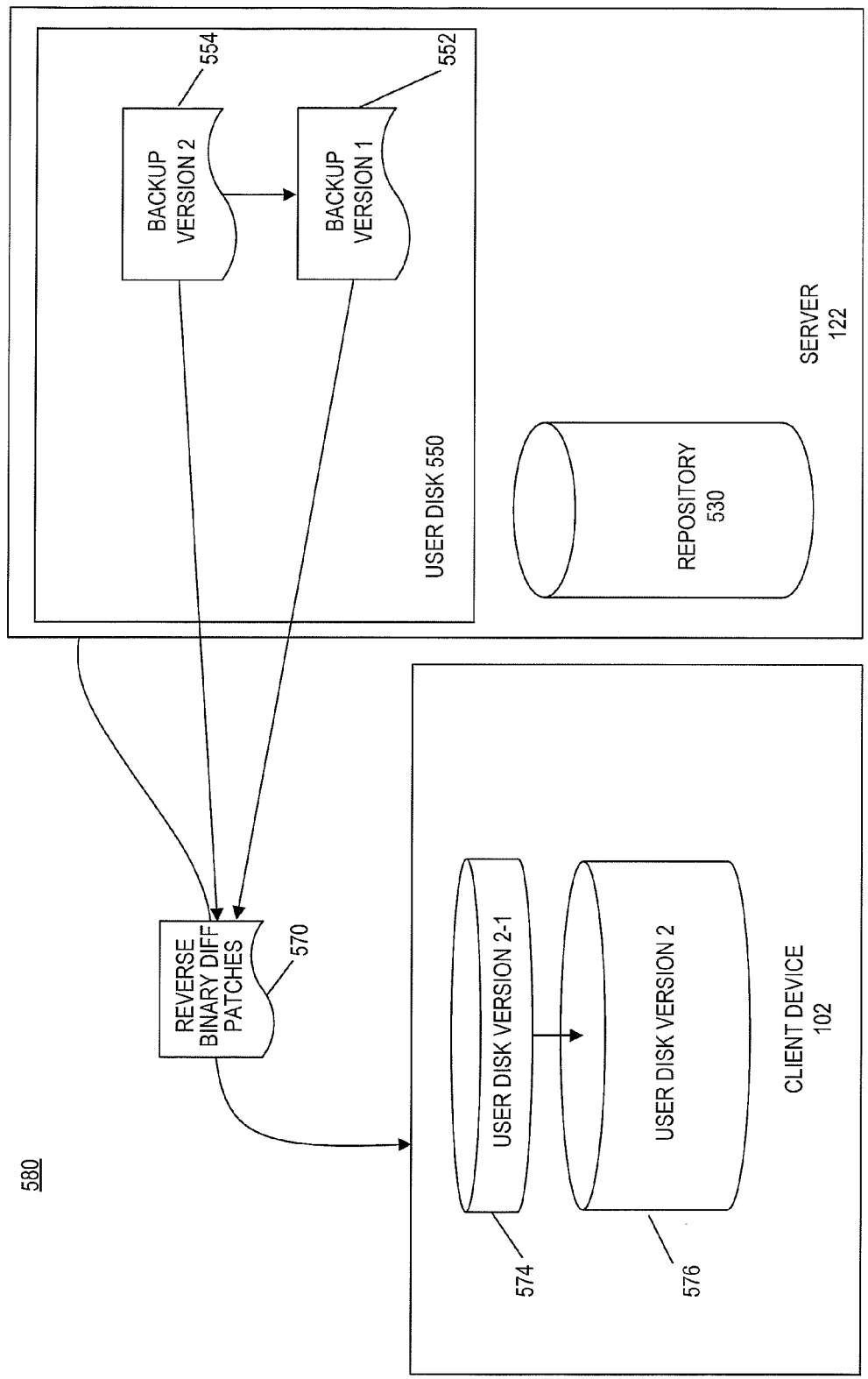
FIG. 5B is a block diagram illustrating a communication system for re-provisioning a virtual user disk using binary differencing patches, consistent with embodiments of the present disclosure.

FIG. 5B is a block diagram illustrating a communication system 580 for re-provisioning a user disk using binary patches. In some embodiments, server 122 can provide one or more reverse binary differencing patches 570 for re-provisioning of the user disk of a virtual machine of client device 102. Referring to FIGS. 5A and 5B, after server 122 receives one or more binary differencing patches 560 representing one or more backup versions of the user disk of client device 102, it can store binary differencing patches 560 in repository 530. Server 122 can also apply the one or more binary differencing patches 560 to provide, for example, one or more backup version of a user disk 550 corresponding to the one or more backup versions of the user disk of client device 102. As an example, server 122 can provide backup version 1 552 of user disk 550 and backup version 2 554 of user disk 550. Backup version 2 554 can be a subsequent backup version than backup version 1 552.

In some embodiments, for restoring or re-provisioning the user disk of client device 102, server 122 can generate differences between the latest backup version and the backup version that is desired to be re-provisioned to the user disk. For example, if the latest backup version of the user disk is backup version 2 554 and the re-provisioning requires to restore, reverse, or rollback the user disk of client device to correspond to backup version 1 552, server 122 can provide differences between backup version 1 552 and backup version 2 554. The differences between backup version 1 552 and backup version 2 554 can correspond to the modification of sectors or blocks for reversing backup version 2 554 to backup version 1 552 of user disk 550. For example, to reverse backup version 2 554 to backup version 1 552, for each 2 Mega-Byte block, server 122 can identify sectors that may be required to be modified in backup version 2 554. In some embodiments, after identification of the sectors, server 122 can use these sectors to generate one or more reverse binary differencing patches 570 corresponding to the modification for reversing backup version 2 554 to backup version 1 552. In some embodiments, server 122 can generate one or more reverse binary differencing patches 570 corresponding to the identified sectors while the identification of the remaining sectors are still in progress. In other words, reverse binary differencing patches 570 can be generated on the fly. Server 122 can generate one or more reverse binary differencing patches 570 via, for example, a synchronizer. Reverse binary differencing patches 570 can be transmitted to client device 102 to restore, reverse, or rollback the user disk of client device 102 to a desired backup version.

In some embodiments, if client device 102 requests to restore a prior backup version of the user disk, one or more reverse binary differencing patches 570 can correspond to differences for restoring the desired prior backup version (e.g., version 1, not shown) of the user disk from a later version (e.g., version 2 576) of the user disk. In some embodiments, reverse binary differencing patches 570 can also correspond to differences between a series of backup versions of the user disk.

As shown in FIG. 5B, in some embodiments, after client device 102 receives one or more reverse binary differencing patches 570, client device 102 can delete or discard the latest version of the user disk (not shown), which represents the latest modification after the last backup time. Before the next backup time is reached, client device 102 does not transmit the latest version of the user disk to server 122. After the latest version of the user disk is deleted or discarded, client device 102 can provide an empty differencing disk (not shown) and apply one or more reverse binary differencing patches 570 to convert the empty differencing disk to user disk version 2-1 574. User disk version 2-1 574 can be implemented by any virtual disk technology supported by client device 102. For example, user disk version 2-1 574 can be implemented using the VMDK format. User disk version 2-1 574 can include differences that may be required to convert user disk version 2 576 to the user disk version 1 (i.e., the desired prior backup version). Client device 102 can thus use user disk version 2-1 574 to restore the user disk version 1 from user disk version 2 576.

In some embodiments, after client device 102 receives one or more reverse binary differencing patches 570 representing, for example, a series of backup versions of the user disk of client device 102, client device 102 can use one or more reverse binary differencing patches 570 to rebuild a prior backup version of the user disk. For example, client device 102 can request to restore the desired backup version (e.g., the user disk version 1) from a user disk version 4 (not shown). Client device 102 can download one or more reverse binary differencing patches 570 corresponding to backup versions 1-4 of the user disk of client device 102. After client device 102 receives one or more reverse binary differencing patches 570, client device 102 can provide an empty differencing disk and apply one or more reverse binary differencing patches 570 to convert the empty differencing disk to a user disk version 4-1 (not shown). The user disk version 4-1 can thus include differences required to restore the user disk version 1 from the user disk version 4. Client device 102 can thus use the user disk version 4-1 to restore the user disk version 1 from the user disk version 4.

FIG. 6 is a flowchart of an exemplary method 600 for virtual disk provisioning associated with a first computing device. It will be readily appreciated that the illustrated procedure can be altered to delete steps or further include additional steps. After initial step 610, a first computing device (e.g., server 122) can provide (620) a first virtual disk and a first publish differencing disk. The first virtual disk can be associated with a first mainline version, and the first publish differencing disk can represent modifications of the first virtual disk. The first computing device can also obtain (630) meta data associated with the first virtual disk and the first publish differencing disk. The meta data can indicate, for example, which blocks and/or sectors of the virtual disks are modified from the previous version of the virtual disks.

In some embodiments, using the meta data associated with the first virtual disk and the meta data associated with first publish differencing disk, the first computing device can identify which blocks and/or sectors can be included in one or more binary differencing patches. For example, if the first mainline version is the initial mainline version for installing a system disk of a virtual machine executed by a second computing device (e.g., client 102), the first computing device can identify, using the meta-data associated with the first virtual disk, that all blocks and/or sectors in the first virtual disk are modified (i.e., modified from an empty disk). In some embodiments, if there is a prior mainline version to the first mainline version, the first computing device can identify any modifications between the first mainline version and such prior mainline version. Moreover, using the meta-data associated with the first publish differencing disk, the first computing device can identify which blocks or sectors of the first virtual disk correspond to the modifications included in the first publish differencing disk. As discussed above, such modification can enable the first mainline version to be executed by a second computing device. In particular, as an example, to generate the binary differencing patches, for each 2 Mega-Byte block, the first computing device can identify sectors that are modified or updated.

After providing the first virtual disk and the first publish differencing disk, and obtaining the meta data, the first computing device can generate (640), based on the meta data associated with the first virtual disk and the first publish differencing disk, one or more first and second differencing patches corresponding to the first virtual disk and one or more second differencing patches corresponding to the first publish differencing disk. The first and second differencing patches can have a binary format.

In some embodiments, after identification of the sectors using the corresponding meta data, the first computing device can write these sectors in binary format to generate the one or more first and second binary differencing patches. For example, using the meta data associated with the first virtual disk and the first publish differencing disk, the first computing device can generate the first binary differencing patches and the second binary differencing patches. In some embodiments, the first computing device can generate one or more binary differencing patches corresponding to the identified sectors while the identification of the remaining sectors are still in progress. In other words, the binary differencing patches can be generated on the fly. Binary differencing patches can be, for example, in VCDIFF generic differencing and compression data format (VCDIFF format), as described in the RFC 3284 standard. The first computing device can write the sectors via, for example, a synchronizer. Because the first computing device has knowledge of the version of the virtual disk that the second computing device is currently executing, the first computing device can thus provide the one or more first and second binary differencing patches to the second computing device to install or update the corresponding virtual disk.

In some embodiments, the first computing device can store (step not shown) data associated with the first virtual disk and the first publish differencing disk, the meta data, and the one or more first and second differencing patches. After generating the one or more first and second differencing patches, the first computing device can provide (650) the one or more first and second differencing patches to the second computing device. In some embodiments, the first virtual disk and the first publish differencing disk can support at least one of a VHD format, a VHDX format, and a VMDK format.

As described above, the first mainline version can provide, for example, the initial mainline version for installing the system disk of the virtual machine executed by the second computing device. In some embodiments, after the first computing device provides the first virtual disk, updates to the first mainline version can occur and such updates may need to be provided to the second computing device. As an example, a system file can be modified or an additional application or process can be started. As another example, an update may include a hot-fix or an operating system service pack. As a result, the first computing device can provide new mainline versions, such as a second mainline version and a third mainline version, so that the virtual machines of the second computing device can be updated. In some embodiments, the new mainline version of the virtual disk can include disk modifications from a prior mainline version. For example, a second mainline version can represent modifications from the first mainline version; and the third mainline version can represent modifications from the second mainline version. The first computing device can generate binary differencing patches corresponding to theses disk modification and provide them to the second computing device.

In some embodiments, the first computing device can provide another publish differencing disk corresponding to the new mainline version. But in some embodiments, it may not. For example, if it is not desired to provide the second mainline version immediately to the client devices, modifications to enable the second computing device to execute the second mainline version may not be required, and thus the first computing device may not provide another publish differencing disk corresponding to the second mainline version. The first computing device can instead provide a second publish differencing disk corresponding to the third mainline version. The second publish differencing disk can correspond to modifications to enable the client devices to execute the third mainline version. In some embodiments, to enable such execution, the first computing device provides the second mainline version, the third mainline version, and the second publish differencing disk to the client device in binary differencing patches.

In some embodiments, virtual disks, such as a second virtual disk corresponding to the second mainline version, a third virtual disk corresponding to the third mainline version, and the second publish differencing disk, can be implemented using any virtual disk technology supported by the first computing device. For example, the second and third virtual disks and the second publish differencing disk can be implemented in the VHD format. Similar to the first virtual disk, the second virtual disk and the third virtual disk can include, for example, system files and disk partitions for updating a virtual machine executed by the second computing device. The second and third virtual disks, and the second publish differencing disk can also include meta data, which can indicate, for example, which blocks and/or sectors are modified or updated. As an example, using the meta data associated with the second virtual disk, the first computing device can identify (e.g., for each 2 Mega-Byte block) which blocks or sectors of first virtual disk are modified. Similarly, using the meta data associated with the third virtual disk, the first computing device can identify which blocks or sectors of the second virtual disk are modified. And using the meta data associated with the second publish differencing disk, the first computing device can identify which blocks and/or sectors of the second virtual disk correspond to the modifications included in the second publish differencing disk.

In some embodiments, the first computing device can generate one or more binary differencing patches corresponding to the identified sectors while the identification of the remaining sectors are still in progress. In other words, the binary differencing patches can be generated on the fly. Binary differencing patches can be, for example, in VCDIFF generic differencing and compression data format (VCDIFF format), as described in the RFC 3284 standard. The first computing device can write the sectors via, for example, a synchronizer. Because the first computing device can have knowledge of the version of the virtual disk that the second computing device is currently executing, the first computing device can thus provide the one or more binary differencing patches (e.g., the second virtual disk and the second publish differencing disk) to the second computing device to update the corresponding virtual disk.

As shown in FIG. 6, after step 650, process 600 can proceed to an end 660. Process 600 can also be repeated to provide virtual disk provisioning to one or more virtual machines of the second computing device as many times as desired.

FIG. 7 is a flowchart of an exemplary method 700 for virtual disk provisioning associated with a second computing device. It will be readily appreciated that the illustrated procedure can be altered to delete steps or further include additional steps. After initial step 710, the second computing device (e.g., client device 102) can obtain (720), such as download, one or more differencing patches from a first computing device. The differencing patches can have a binary format. The one or more binary differencing patches can correspond to a new mainline version of the system disk of a virtual machine of the second computing device, and a corresponding publish differencing disk. As an example, for an initial installing or deploying of a virtual machine on the second computing device, the second computing device can download one or more first binary differencing patches that correspond to the initial mainline version of the system disk and one or more second binary differencing patches that correspond to modifications of the initial mainline version for enabling execution on the second computing device.

After downloading the first and second binary differencing patches, the second computing device can provide (730) a first virtual disk and a first publish differencing disk using the first and second binary differencing patches. The first virtual disk is associated with a first mainline version and the first publish differencing disk represents modifications of the first virtual disk. For example, the second computing device can provide a first empty differencing disk for the first mainline version and apply the first binary differencing patches to convert the first empty differencing disk to the first virtual disk. Similarly, the second computing device can provide a second empty differencing disk and apply the second binary differencing patches to convert the second empty differencing disk to the first publish differencing disk. Virtual disks, such as the first virtual disk and the first publish differencing disk, can be implemented using any virtual disk technology supported by the second computing device. For example, they can be implemented using the VMDK format.

Moreover, the second computing device can also generate (740) a first preparation differencing disk and a first runtime differencing disk. In some embodiments, the second computing device can use the first preparation differencing disk to receive the localized preparation changes. For example, the second computing device can provide a third empty differencing disk on top of the first publish differencing disk. After receiving the local preparation changes that can personalize the virtual machine for a particular user, the second computing device can apply those local preparation changes and thus convert the third empty differencing disk to the first preparation differencing disk. Moreover, in some embodiments, the second computing device can use the first runtime differencing disk to store changes made at the virtual machine's runtime. For example, the second computing device can provide a fourth empty differencing disk on top of the first preparation differencing disk. While a virtual machine of the second computing device is running, runtime changes can be made and stored in this fourth empty differencing disk, which becomes the first runtime differencing disk. In some embodiments, after each reboot of the virtual machines, runtime changes may no longer be needed and thus may be discarded after each reboot. Virtual disks, such as the first preparation differencing disk and the first runtime differencing disk, can be implemented using any virtual disk technology supported by the second computing device. For example, the first preparation differencing disk and the first runtime differencing disk can be implemented using the VMDK format.

In some embodiments, the second computing device can download the one or more binary differencing patches corresponding to a particular virtual machine executed by the second computing device, and apply them to provide system disks. As described above, a system disk can include updates of the system files, processes, application, service packs, etc. In some embodiments, using the first and second binary differencing patches, the second computing device can generate the first virtual disk and the first preparation differencing disk, which can correspond to the first virtual disk and the first publish differencing disk of the first computing device. After also generating the first preparation differencing disk and the first runtime differencing disk, the second computing device can use these disks to execute the virtual machine.

In some embodiments, the second computing device can download one or more binary differencing patches corresponding to the updates of the mainline versions of a system disk of a virtual machine on the second computing device. For example, the second computing device can download one or more third binary differencing patches, fourth binary differencing patches, and fifth binary differencing patches. After downloading these binary differencing patches, the second computing device can generate a second virtual disk associated with a second mainline version, a third virtual disk associated with a third mainline version, and a second preparation differencing disk, respectively. For example, the second computing device can provide a fifth and sixth empty differencing disks for the mainline versions and apply the third binary differencing patches and the fourth binary differencing patches to convert the fifth and sixth empty differencing disks to a second virtual disk and a third virtual disk, respectively. Similarly, the second computing device can provide a seventh empty differencing disk and apply the fifth binary differencing patches to convert the seventh empty differencing disk to the second publish differencing disk. Virtual disks, such as the second virtual disk, the third virtual disk, and the second publish differencing disk, can be implemented using any virtual disk technology supported by the second computing device. For example, they can be implemented using the VMDK format. Moreover, the second virtual disk can be generated on top of the first virtual disk (i.e., the prior mainline version), and the third virtual disk can be generated on top of the second virtual disk. Corresponding to those in the first computing device, the second virtual disk can include disk modifications from the first virtual disk; and the third virtual disk can include disk modifications from the second virtual disk. In some embodiments, the second binary differencing disk can include modifications of the third virtual disk for enabling execution of the third mainline version on the second computing device. In some embodiments, the third and fourth binary differencing patches can be combined, and thus the second computing device can generate a combined second and third virtual disks.

In some embodiments, the second computing device can also generate a second preparation differencing disk and a second runtime differencing disk. For example, the second computing device can provide an eighth empty differencing disk on top of the second publish differencing disk. After receiving the local preparation changes that can personalize the virtual machine for a particular user, the second computing device can convert the eighth empty differencing disk to the second preparation differencing disk. Moreover, in some embodiments, the second computing device can use the second runtime differencing disk to receive changes made at the virtual machine's runtime. For example, the second computing device can provide a ninth empty differencing disk on top of the second preparation differencing disk. While a virtual machine of the second computing device is running, runtime changes can be made and stored in this ninth empty differencing disk, which becomes the second runtime differencing disk. In some embodiments, after each reboot of the virtual machines, runtime changes may no longer be needed and thus may be discarded after each reboot. Virtual disks, such as the second preparation differencing disk and the second runtime differencing disk, can be implemented using any virtual disk technology supported by the second computing device. For example, they can be implemented using the VMDK format.

In some embodiments, the second computing device can download the one or more binary differencing patches and apply them to provide updates of a system disk and/or a user disk. As described above, a system disk can include updates of the system files, processes, application, service packs, etc. Using the third, fourth, and fifth binary differencing patches, the second computing device can generate the second virtual disk, the third virtual disk, and the second preparation differencing disk, which can correspond to the their counterparts of the first computing device. Moreover, after generating the second preparation differencing disk and the second runtime differencing disk, the second computing device can use these disks to execute the virtual machine.

In some embodiments, the second computing device can prepare a new virtual machine to execute an updated version of the system disks while the virtual machine still executing a current version. For example, while the virtual machine is still executing the current version by using disks including the first virtual disk, the first publish differencing disk, the first preparation differencing disk, and the first runtime differencing disk, the second computing device can download the third, fourth, and fifth binary differencing patches, and prepare virtual disks including the second virtual disk, the third virtual disk, the second preparation differencing disk, the second preparation differencing disk, and the second runtime differencing disk. After the virtual disks of the updated version is prepared, the second computing device can boot the new virtual machine by using the virtual disks associated with the updated version of the system disks with limited memory size and/or limited or no network availability.

In some embodiments, the new virtual machine that executes the updated version of the system disk can co-exist with the current virtual machine that uses the current version of the system disks. Moreover, the new virtual machine can also use Plug-n-Play (PnP) to install virtual devices such as emulated devices, disks, network, and mouse. The new virtual machine can also perform user personalization including configuring user's workgroup and creating the user's domain account profile.

In some embodiments, after the second computing device prepares, such as boots, the new virtual machine using the virtual disks associated with the updated version of the system disks, the second computing device can delete the virtual disks associated with the old version of the system disks. For example, after booting using the virtual disks associated with the third virtual disk, the second computing device can delete the first preparation differencing disk, the first runtime differencing disk, and the first publish differencing disk. In some embodiments, after the new virtual machine is booted, the old mainline version (e.g., the first mainline version) of the system disk can be merged or combined with the updated mainline version (e.g., the second and the third mainline versions) of the system disk, so that the combined version represents the current version of the system disk.

In some embodiments, the second computing device can receive one or more binary differencing patches representing updates of more than one version of the system disk. For example, the second computing device can have the first mainline version as its current mainline version of the system disk. Under some circumstances (e.g., network congestion or network interruption), the first mainline version may not be updated for a period of time during which the first computing device publishes the second and third mainline versions of the system disk. As a result, the second computing device can receive binary differencing patches representing, for example, differences between multiple mainline versions (e.g., between the third mainline version and the second mainline version, and between the second mainline version and the first mainline version) of the system disk or a chain of updates of the system disk. The second computing device can thus download all the differences in binary format (e.g., a combined binary differencing patch) and apply them to generate the one or more mainline versions (e.g., the second mainline version and the third mainline version, or a combine version).

In some embodiments, the second computing device may not be executing any version of a virtual machine while the first computing device has already provided multiple mainline versions. The second computing device can thus receive binary differencing patches representing, for example, differences between multiple mainline versions (e.g., between the third and second mainline versions, between the second and first mainline versions, and between the first mainline version and an empty disk) of the system disk or a chain of updates of the system disk. The second computing device can thus download all the differences in binary format (e.g., a combined binary differencing, not shown) and apply them to generate one or more mainline versions (e.g., the first, second, and third versions, or a combine version).

After step 730, process 700 can proceed to an end 740. Process 700 can also be repeated any number of times to provision a virtual disk of one or more virtual machines executed by the second computing device.

Figure 8:
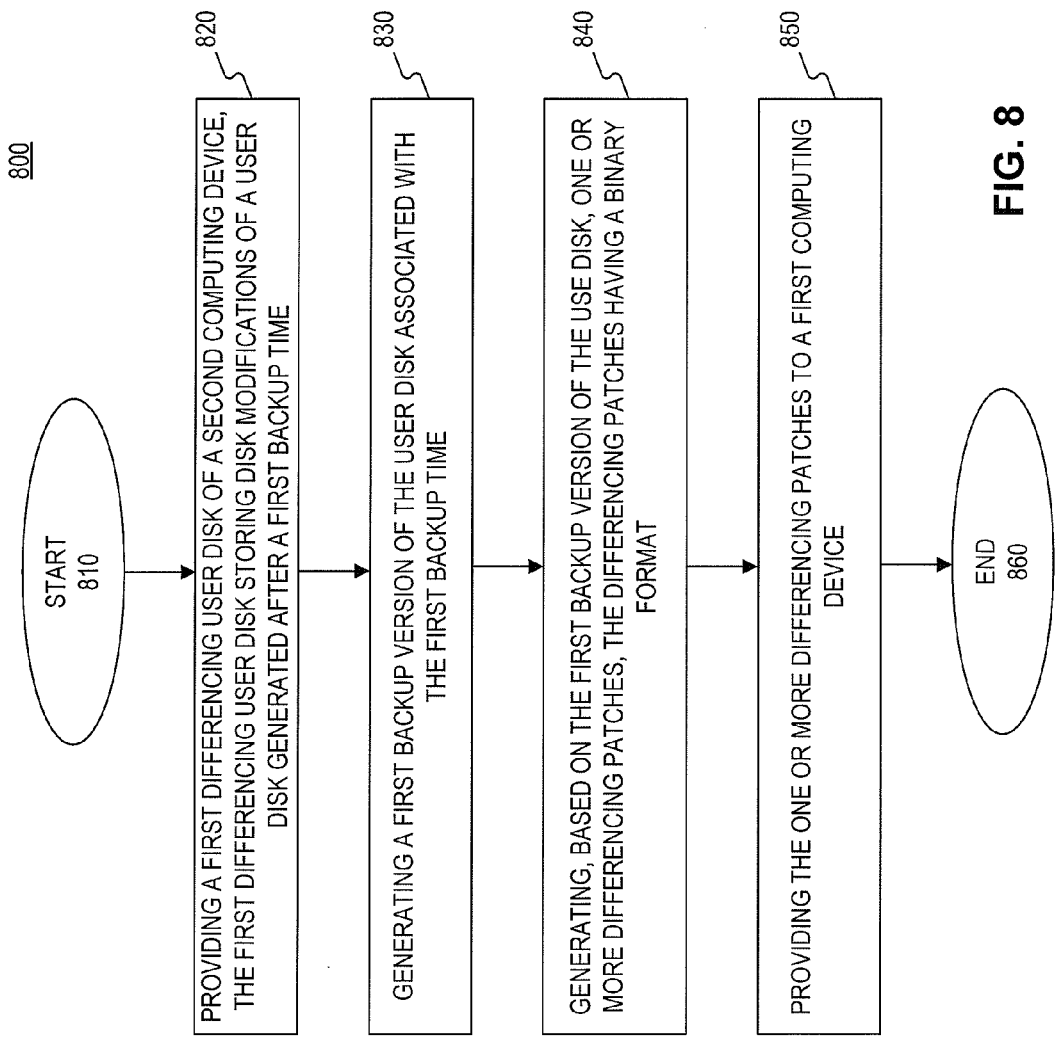
FIG. 8 is a flowchart of an exemplary method for providing backing-up of a virtual user disk, consistent with embodiments of the present disclosure.

FIG. 8 is a flowchart of an exemplary method 800 for providing backing-up of a virtual user disk. It will be readily appreciated that the illustrated procedure can be altered to delete steps or further include additional steps. After initial step 810, a second computing device (e.g., client device 102) can provide (820) a first differencing user disk of a second computing device. The first differencing user disk can store disk modifications of a user disk generated after a first backup time. The second computing device can also generate (830) a first backup version of the user disk associated with the first backup time. The second computing device can further generate (840), based on the first backup version of the user disk, one or more differencing patches that have a binary format.

In some embodiments, the second computing device can perform an initial backup and/or subsequent backups of the user disk. As an example, the second computing device can transmit binary differencing patches corresponding to a first backup version of the user disk, to the first computing device. As another example, the second computing device can also transmit binary differencing patches corresponding to subsequent backup versions of the user disk, such as a second backup version of the user disk.

In some embodiments, the first, second, and any subsequent backup versions of the user disk can be, for example, copies, snapshots, or virtual disk files of the user disk at certain time points, such as at certain backup times. Because the user data stored in the user disk can continuously change, the second computing device can capture the user data at a time point for backup. As an example, to generate an initial backup, the second computing device can provide a first differencing user disk (e.g., an empty differencing disk) on top of a first user disk at a first backup time. The second computing device can thus store any modifications of the first user disk that are generated after the first backup time in the first differencing user disk. As a result, the first user disk is not modified after the first backup time and can thus be used as the first backup version of the user disk. In some embodiments, the second computing device can convert the first differencing user disk to a second user disk. The second user disk can store, for example, modifications of the first backup version of the user disk generated after the first backup time.

As another example, to generate a subsequent backup, the second computing device can provide a second differencing user disk on top of the second user disk at a later time point, such as the second backup time. The second computing device can store any modifications of the second user disk generated after the second backup time in the second differencing user disk. As a result, the second user disk is not modified after the second backup time and can be used as the second backup version of the user disk. In some embodiments, the second computing device can convert the second differencing user disk to a third user disk, which can store, for example, modifications of the second backup version of the user disk generated after the second backup time. It is appreciated that any number of backup versions of the user disk can be generated in any manner that is desired. In some embodiments, the second computing device can combine or merge one or more backup versions of the user disk.

In some embodiments, the first, the second, and any subsequent backup versions of the user disk can be implemented using any virtual disk technology supported by the second computing device. For example, they can be implemented using the VMDK format. The backup versions of the user disk can include, for example, user data. They can also include meta data, which can indicate which blocks and/or sectors are modified. For example, meta data associated with the second backup version of the user disk can indicate which blocks and/or sectors of the first backup version of the user disk correspond to the modification stored in the second backup version of the user disk. In some embodiments, using the meta data associated with the backup versions of the user disk, the second computing device can identify which blocks and/or sectors can be included in one or more binary differencing patches representing the corresponding backup versions. In particular, as an example, for each 2 Mega-Byte block, the second computing device can identify sectors in the first or second backup version of the user disk that can be included in the one or more binary differencing patches representing such first or second backup version of the user disk.

In some embodiments, after identifying sectors that are modified for one or more blocks, the second computing device can generate the one or more binary differencing patches corresponding to the identified sectors. As an example, the second computing device can generate binary differencing patches corresponding to each of the user disk backup versions, e.g., the first, the second, and any subsequent backup versions of the user disk. As another example, the second computing device can combine the one or more binary differencing patches corresponding to different user disk backup versions, e.g. combine binary differencing patches corresponding to the first and the second backup version of the user disk.

In some embodiments, the second computing device can generate the one or more binary differencing patches corresponding to the identified sectors while the identification of the remaining sectors are still in progress. In other words, the binary differencing patches can be generated on the fly. The binary differencing patches can be, for example, in VCDIFF format, as described in the RFC 3284 standard. In some embodiments, the binary differencing patches can be generated by performing a differencing operation using binary data stored on physical disks. The stored binary data can correspond to different backup versions of the user disk, e.g., the first and the second backup version of the user disk.

In some embodiments, the second computing device can store (not shown) data associated with the virtual user disk, the user differencing disk, and the one or more differencing patches. After generating the binary differencing patches, the second computing device can provide (850), such as transmit, the binary differencing patches, to the first computing device. After step 850, process 800 can proceed to an end 860. Process 800 can also be repeated any desired number of times for providing one or more versions of user disks corresponding to one or more virtual machines of the second computing device.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A first computing device for provisioning a virtual machine, the first computing device comprising:
one or more processors configured to:
provide a first virtual disk and a first publish differencing disk, wherein the first virtual disk is associated with a first mainline version, and the first publish differencing disk represents modifications of the first virtual disk,
obtain a first set of meta data associated with the first virtual disk and a second set of meta data associated with the first publish differencing disk wherein the first set of meta data includes information associated with one or more first sectors corresponding to the first virtual disk, and wherein the second set of meta data includes information associated with one or more second sectors corresponding to modifications of the first virtual disk;
generate, based on the first set of meta data, one or more first differencing patches corresponding to the first virtual disk using the one or more first sectors, and, based on the second set of meta data, one or more second differencing patches corresponding to the first publish differencing disk using the one or more second sectors, the first and second differencing patches having a binary format;
a storage configured to store data associated with the first virtual disk and the first publish differencing disk, the first set of meta data, the second set of meta data, and the one or more first and second differencing patches; and
a communication subsystem partially implemented in hardware configured to provide the one or more first differencing patches and the one or more second differencing patches to provision the virtual machine associated with a second computing device.

2. The first computing device of claim 1, wherein the first virtual disk and the first publish differencing disk support at least one of VHD format, VHDX format, VMDK format, qcow format, qcow2 format, VDI format, and HDD format.

3. The first computing device of claim 1, wherein at least the first virtual disk corresponds to a system disk of the second computing device.

4. The first computing device of claim 1, wherein the one or more processors are configured to generate the one or more first and second differencing patches further comprises the one or more processors to:
identify, using the meta data associated with the first virtual disk, the one or more first sectors corresponding to the first virtual disk;

identify, using the meta data associated with the first publish differencing disk, the one or more second sectors corresponding to the modifications of the first virtual disk;

apply the identified one or more first sectors to generate the one or more first differencing patches; and apply the identified one or more second sectors to generate the one or more second differencing patches.

5. The first computing device of claim 1, wherein the one or more processors are further configured to:

provide a second virtual disk and a second publish differencing disk, wherein the second virtual disk represents modifications between a second mainline version and the first mainline version, and the second publish differencing disk represents modifications of the second virtual disk; and obtain meta data associated with the second virtual disk and the second publish differencing disk.

6. The first computing device of claim 5, wherein the one or more processors are further configured to generate, based on the meta data associated with the second virtual disk and the second publish differencing disk, one or more third differencing patches corresponding to the second virtual disk and one or more fourth differencing patches corresponding to the second publish differencing disk, the third and fourth differencing patches having a binary format.

7. The first computing device of claim 6, wherein the communication subsystem is further configured to provide the third and fourth differencing patches to update the provisioning of the virtual machine associated with the second computing device.

8. The first computing device of claim 1, wherein the one or more processors are further configured to provide a second virtual disk, wherein the second virtual disk represents modifications between a second mainline version and the first mainline version;

determine whether to roll back the second mainline version to the first mainline version; and delete the second virtual disk based on the determination.

9. The first computing device of claim 1, wherein the first and second differencing patches have a VCDIFF format.

10. The first computing device of claim 1, wherein the second computing device is designated for testing.

11. A method for provisioning a virtual machine, the method being performed by a first computing device that includes one or more processors, the method comprising:

providing a first virtual disk and a first publish differencing disk, wherein the first virtual disk is associated with a first mainline version, and the first publish differencing disk represents modifications of the first virtual disk;

obtaining a first set of meta data associated with the first virtual disk and a second set of meta data associated with the first publish differencing disk wherein the first set of meta data includes information associated with one or more first sectors corresponding to the first virtual disk, and wherein the second set of meta data includes information associated with one or more second sectors corresponding to modifications of the first virtual disk;

generating, based on the first set of meta data, one or more first differencing patches corresponding to the first virtual disk using the one or more first sectors, and, based on the second set of meta data, one or more second differencing patches corresponding to the first publish differencing disk using the one or more second sectors, the first and second differencing patches having a binary format;

storing data associated with the first virtual disk and the first publish differencing disk, the first set of meta data, the second set of meta data, and the one or more first and second differencing patches; and providing the one or more first differencing patches and the one or more second differencing patches to provision the virtual machine associated with a second computing device.

12. The method of claim 11, wherein the first virtual disk and the first publish differencing disk support at least one of VHD format, VHDX format, VMDK format, qcow format, qcow2 format, VDI format, and HDD format.

13. The method of claim 11, wherein at least the first virtual disk corresponds to a system disk of the second computing device.

14. The method of claim 11, wherein generating the one or more first and second differencing patches comprising:

identifying, using the meta data associated with the first virtual disk, the one or more first sectors corresponding to the first virtual disk;

identifying, using the meta data associated with the first publish differencing disk, the one or more second sectors corresponding to the modifications of the first virtual disk;

applying the identified one or more first sectors to generate the one or more first differencing patches; and applying the identified one or more second sectors to generate the one or more second differencing patches.

15. The method of claim 11, further comprising:

providing a second virtual disk and a second publish differencing disk, wherein the second virtual disk represents modifications between a second mainline version and the first mainline version, and the second publish differencing disk represents modifications of the second virtual disk; and obtaining meta data associated with the second virtual disk and the second publish differencing disk.

16. The method of claim 15, further comprising generating, based on the meta data associated with the second virtual disk and the second publish differencing disk, one or more third differencing patches corresponding to the second virtual disk and one or more fourth differencing patches corresponding to the second publish differencing disk, the third and fourth differencing patches having a binary format.

17. The method of claim 16, further comprising providing the third and fourth differencing patches to update the provisioning of the virtual machine associated with the second computing device.

18. The method of claim 11, further comprising:

providing a second virtual disk, wherein the second virtual disk represents modifications between a second mainline version and the first mainline version;

determining whether to roll back the second mainline version to the first mainline version; and deleting the second virtual disk based on the determination.

19. The method of claim 11, wherein the first and second differencing patches have a VCDIFF format.

20. The method of claim 11, wherein the second computing device is designated for testing.

21. A non-transitory computer readable storage medium storing instructions that are executable by a first computing device that includes one or more processors to cause the first computing device to perform a method for provisioning a virtual machine, the method comprising:

providing a first virtual disk and a first publish differencing disk, wherein the first virtual disk is associated with a first mainline version, and the first publish differencing disk represents modifications of the first virtual disk;

obtaining a first set of meta data associated with the first virtual disk and a second set of meta data associated with the first publish differencing disk wherein the first set of meta data includes information associated with one or more first sectors corresponding to the first virtual disk, and wherein the second set of meta data includes information associated with one or more second sectors corresponding to modifications of the first virtual disk;

generating, based on the first set of meta data, one or more first differencing patches corresponding to the first virtual disk using the one or more first sectors, and, based on the second set of meta data, one or more second differencing patches corresponding to the first publish differencing disk using the one or more second sectors, the first and second differencing patches having a binary format;

storing data associated with the first virtual disk and the first publish differencing disk, the first set of meta data, the second set of meta data, and the one or more first and second differencing patches; and providing the one or more first differencing patches and the one or more second differencing patches to provision the virtual machine associated with a second computing device.

22. The computer readable storage medium of claim 21, wherein the first virtual disk and the first publish differencing disk support at least one of VHD format, VHDX format, VMDK format, qcow format, qcow2 format, VDI format, and HDD format.

23. The computer readable storage medium of claim 21, wherein at least the first virtual disk corresponds to a system disk of the second computing device.

24. The computer readable storage medium of claim 21, wherein generating the one or more first and second differencing patches comprising:

identifying, using the meta data associated with the first virtual disk, the one or more first sectors corresponding to the first virtual disk;

identifying, using the meta data associated with the first publish differencing disk, the one or more second sectors corresponding to the modifications of the first virtual disk;

applying the identified one or more first sectors to generate the one or more first differencing patches; and applying the identified one or more second sectors to generate the one or more second differencing patches.

25. The computer readable storage medium of claim 21, further comprising:

providing a second virtual disk and a second publish differencing disk, wherein the second virtual disk represents modifications between a second mainline version and the first mainline version, and the second publish differencing disk represents modifications of the second virtual disk; and obtaining meta data associated with the second virtual disk and the second publish differencing disk.

26. The computer readable storage medium of claim 25, further comprising generating, based on the meta data associated with the second virtual disk and the second publish differencing disk, one or more third differencing patches corresponding to the second virtual disk and one or more fourth differencing patches corresponding to the second publish differencing disk, the third and fourth differencing patches having a binary format.

27. The computer readable storage medium of claim 26, further comprising providing the third and fourth differencing patches to update the provisioning of the virtual machine associated with the second computing device.

28. The computer readable storage medium of claim 21, further comprising:

providing a second virtual disk, wherein the second virtual disk represents modifications between a second mainline version and the first mainline version;

determining whether to roll back the second mainline version to the first mainline version; and deleting the second virtual disk based on the determination.

29. The computer readable storage medium of claim 21, wherein the first and second differencing patches have a VCDIFF format.

30. The computer readable storage medium of claim 21, wherein the second computing device is designated for testing.

* * * * *